(12) United States Patent
Idreos et al.

(10) Patent No.: US 11,567,952 B2
(45) Date of Patent: Jan. 31, 2023

(54) SYSTEMS AND METHODS FOR ACCELERATING EXPLORATORY STATISTICAL ANALYSIS

(71) Applicant: PRESIDENT AND FELLOWS OF HARVARD COLLEGE, Cambridge, MA (US)

(72) Inventors: Stratos Idreos, Cambridge, MA (US); Wasay Abdul, Cambridge, MA (US); Niv Dayan, Somerville, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 381 days.

(21) Appl. No.: 16/607,510

(22) PCT Filed: Apr. 23, 2018

(86) PCT No.: PCT/US2018/028789
§ 371 (c)(1),
(2) Date: Oct. 23, 2019

(87) PCT Pub. No.: WO2018/200348
PCT Pub. Date: Nov. 1, 2018

(65) Prior Publication Data
US 2021/0279237 A1 Sep. 9, 2021

Related U.S. Application Data

(60) Provisional application No. 62/489,204, filed on Apr. 24, 2017.

(51) Int. Cl.
*G06F 16/00* (2019.01)
*G06F 16/2458* (2019.01)
*G06F 16/22* (2019.01)
*G06F 16/2453* (2019.01)

(52) U.S. Cl.
CPC ...... *G06F 16/2462* (2019.01); *G06F 16/2246* (2019.01); *G06F 16/24545* (2019.01)

(58) Field of Classification Search
None
See application file for complete search history.

(56) References Cited

U.S. PATENT DOCUMENTS

| 6,763,357 B1* | 7/2004 | Deshpande | G06F 16/24539 707/999.102 |
| 6,888,965 B1* | 5/2005 | Rath | G06T 7/11 382/173 |

(Continued)

FOREIGN PATENT DOCUMENTS

EP 3016000 A1 5/2016

OTHER PUBLICATIONS

Resonance neutron methods for determining statistical properties of phonon spectra, Lynn et al., (Year: 1996).*

(Continued)

*Primary Examiner* — Jean M Corrielus
(74) *Attorney, Agent, or Firm* — Morgan, Lewis & Bockius LLP

(57) ABSTRACT

Embodiments of the invention utilize a "data canopy" that breaks statistical measures down to basic primitives for various data portions and stores the basic aggregates in a library within an in-memory data structure. When a queried statistical measure involves a basic aggregate stored in the library over a data portion that at least partially overlaps the data portion associated with the basic aggregate, the basic aggregate may be reused in the statistical computation of the queried measure.

23 Claims, 21 Drawing Sheets

(56) References Cited

U.S. PATENT DOCUMENTS

| | | | |
|---|---|---|---|
| 8,977,600 B2* | 3/2015 | Crupi | G06F 16/951 |
| | | | 707/688 |
| 9,411,853 B1* | 8/2016 | Dovrtel | G06F 16/283 |
| 2007/0083495 A1* | 4/2007 | Dettinger | G06F 16/83 |
| 2009/0112799 A1 | 4/2009 | Barsness et al. | |
| 2009/0234821 A1 | 9/2009 | Hirsch et al. | |
| 2013/0330055 A1* | 12/2013 | Zimmermann | G06F 16/78 |
| | | | 386/240 |
| 2014/0279845 A1 | 9/2014 | Ganti et al. | |
| 2016/0371288 A1* | 12/2016 | Le Biannic | G06F 16/90324 |
| 2017/0206256 A1* | 7/2017 | Tsirogiannis | G06F 16/22 |
| 2017/0329873 A1* | 11/2017 | Eide | G06F 21/6254 |
| 2019/0324880 A1* | 10/2019 | Rose | G06F 11/327 |

OTHER PUBLICATIONS

Determining Statistical Properties of Quasi-steady Measured Signals, Brouwer et al., (Year: 2015).*
Canopy—An end-to-end performance tracing and analysis system, Kaldor et al., (Year: 2017).*
Data Canopy—Accelerating Exploratory Statistical Analysis, Wasay et al., (Year: 2017).*
N-Memory Big Data Management and Processing—A Survey, Zhang et al., (Year: 2015).*
International Search Report and Written Opinion issued in a corresponding International Application No. PCT/US2018/028789 dated Jul. 5, 2018.

* cited by examiner

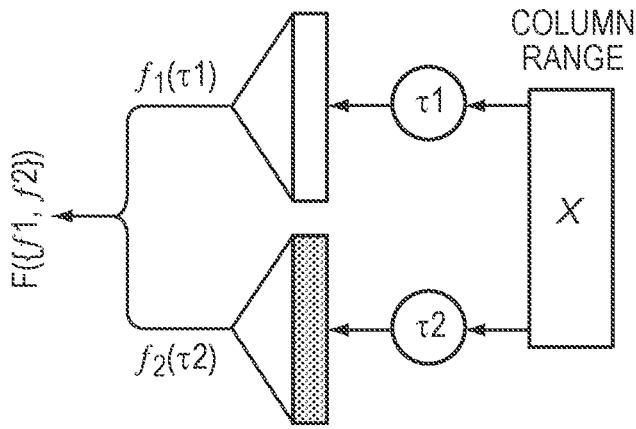

FIG. 3A

| STATISTICS | | BASIC AGGREGATES | | | | |
|---|---|---|---|---|---|---|
| TYPE | FORMULA | $\Sigma x$ | $\Sigma x^2$ | $\Sigma xy$ | $\Sigma y^2$ | $\Sigma y$ |
| MEAN (avg) | $\frac{\Sigma x_i}{n}$ | ▓ | | | | |
| ROOT MEAN SQUARE (rms) | $\sqrt{\frac{1}{n} \cdot \Sigma x^2}$ | | ▓ | | | |
| VARIANCE (var) | $\frac{\Sigma x_i^2 - n \cdot avg(x)^2}{n}$ | ▓ | ▓ | | | |
| STANDARD DEVIATION (std) | $\sqrt{\frac{\Sigma x_i^2 - n \cdot avg(x)^2}{n}}$ | ▓ | ▓ | | | |
| SAMPLE KURTOSIS (kur) | $\frac{1}{n} \Sigma \left(\frac{x_i - avg(x)}{std(x)}\right)^4 - 3$ | ▓ | ▓ | | | |
| SAMPLE COVARIANCE (cov) | $\frac{\Sigma x_i \cdot y_i}{n} - \frac{\Sigma x_i \cdot \Sigma y_i}{n^2}$ | ▓ | | ▓ | | ▓ |
| SAMPLE LINEAR REGRESSION (slr) | $\frac{cov(x,y)}{var(x)}$, avg(x), avg(y) | ▓ | ▓ | ▓ | | ▓ |
| SAMPLE CORRELATION (corr) | $\frac{n \cdot \Sigma x_i \cdot y_i - \Sigma x_i \cdot \Sigma y_i}{\sqrt{n \cdot \Sigma x_i^2 - (\Sigma x_i)^2} \sqrt{n \cdot \Sigma y_i^2 - (\Sigma y_i)^2}}$ | ▓ | ▓ | ▓ | ▓ | ▓ |

FIG. 3B

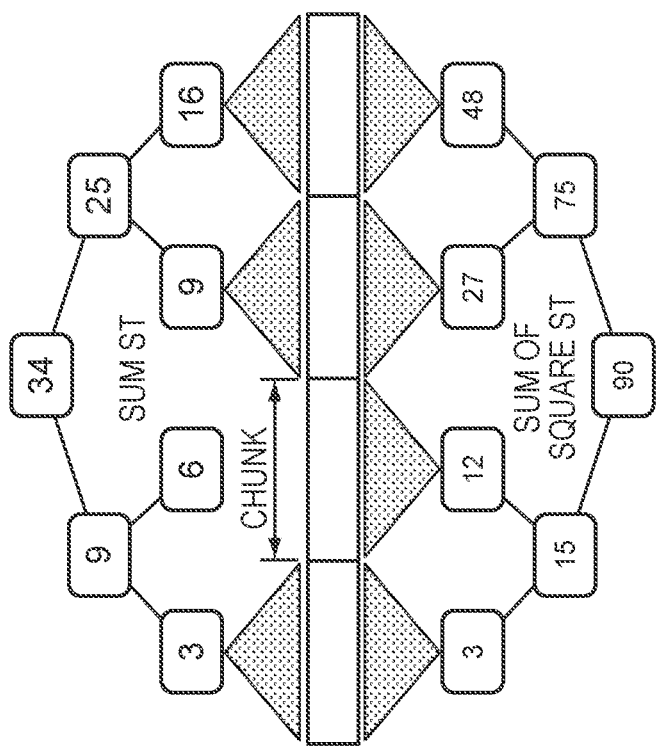

FIG. 4A

| OPTIONS | MEMORY | QUERY/UPDATE |
|---|---|---|
| ST PER DATA CANOPY | $2 \cdot b \cdot c \cdot h - 1$ | $O(\log b \cdot c \cdot h)$ |
| ST PER COLUMN | $2 \cdot b \cdot c \cdot h \cdot c$ | $O(\log b \cdot h)$ |
| ST PER STATISTICS | $2 \cdot b \cdot c \cdot h \cdot s$ | $O(\log c \cdot h)$ |
| ST PER COLUMN PER STAT. | $2 \cdot b \cdot c \cdot h \cdot b \cdot c$ | $O(\log h)$ |

FIG. 4B

| TERM | DESCRIPTION |
|---|---|
| $c$ | NUMBER OF COLUMNS |
| $r$ | NUMBER OF ROWS |
| $h$ | NUMBER OF CHUNKS |
| $s$ | CHUNK SIZE (bytes) |
| $v_d$ | RECORD SIZE (bytes) |
| $v_{st}$ | ST NODE SIZE (bytes) |
| # | CACHE LINE SIZE (bytes) |

SYSTEMS AND METHODS FOR ACCELERATING EXPLORATORY STATISTICAL ANALYSIS

CROSS-REFERENCE TO RELATED APPLICATION

This application is a U.S. National Phase Application of PCT/US2018/028789, filed on Apr. 23, 2018, which claims priority to, and the benefit of, U.S. Provisional Patent Application No. 62/489,204, filed on Apr. 24, 2017. The foregoing applications are hereby incorporated by reference in their entireties.

FIELD OF THE INVENTION

The field of the invention relates, generally, to data exploration and, more particularly, to approaches that accelerate data exploratory statistical analysis.

BACKGROUND

Networked communication systems and the Internet have driven an information revolution and uniquely created a surplus of a valuable new material: data. To infer knowledge from so much information, data scientists may start with an exploratory statistical analysis—an unstructured procedure that allows queries to be performed on large quantities of data in order to compute statistical measures (such as mean, variance, or correlations) thereof, which represent or can be employed to characterize the data meaningfully. Statistical data characteristics may provide insights to summarize variables within a data set, understand trends in variables, and correlate these trends with those of other variables. For example, variance in seismic activity of an area may indicate how prone it is to earthquakes, and correlations between seismic measurements across various sensors may help predict future patterns of seismic activity.

Two queries in data exploration may involve the same statistical computation (e.g., summarizing) on the same portion (or at least a partially overlapping portion) of the data with the same or different resolutions; thus, exploratory statistical analysis generally includes repetitive statistical calculations in nature. FIG. 1 depicts different forms of repetition for various queries of a statistical measure on a given data range.

In addition, repetitive statistical calculations may appear in various workloads. FIG. 2A depicts repetition in two publicly available workloads, SDSS SkyServer and SQLShare, composed of handwritten and computer-generated SQL queries. As shown, up to 97% of the queries repeat at least once in SDSS. While queries repeat less frequently in the SQLShare workload, but up to 55% of the queries still target a non-distinct set of columns.

Conventional tools for exploratory statistical analysis lack a cohesive framework for storing, organizing, and reusing the previously computed statistical measures. As a result, regardless of how many times the statistical measures have been queried and how many times the queried base data have been accessed, a new statistical measure typically must be computed from scratch—i.e., all base data is re-examined. This results in significant computational overhead. For example, FIG. 2B depicts query-response times (bottom) and the amount of data accessed (top) using the conventional tools for computing various statistical measures. Because the conventional tools do not reuse computations and accessed data, a rather stable query response time is required even when the exactly same set of the statistical measures are requested.

Further, because data statistics (such as mean, variance, and correlations) play a critical role in machine learning classifications and filtering algorithms (e.g., linear regression, Bayesian classification or collaborative filtering), failure to store and share statistical computations and data accesses among different users may also undermine the accuracy and robustness of these algorithms. Additionally, as the base data grows, computing statistics from scratch every time disadvantageously results in long-latency response time to incoming queries; this is intolerable in applications such as interactive data analytics.

Accordingly, there is a need for an approach that stores various statistical computations associated with the base data in a manner that permits the stored statistical computations to be reused later, when an incoming query involves the same statistical computations over data portions that at least partially overlap with those of the stored statistical computations.

SUMMARY

The present invention provides a "data canopy" that breaks statistical measures down to basic aggregates (or basic primitives) for various data portions; in various embodiments, the basic aggregates are stored and managed in a library within an in-memory data structure. When a queried statistical measure involves a basic aggregate stored in the library over a data portion that at least partially overlaps the data portion associated with the basic aggregate, the basic aggregate may be reused in the statistical computation of the queried measure. In other words, the data canopy effectively acts as a "smart cache" of the basic aggregates of various statistical measures and thereby allows the queried statistical measure to be synthesized from the smart cache without repeatedly accessing the base data. For example, if a measure of a standard deviation is queried on the base data, the data canopy may store the computed sum and sum of squares as the basic aggregates in the library. The stored sum may be retrieved later to synthesize a different measure (e.g., a mean) of the base data; similarly, the sum of squares may be reused later as one of the ingredients for correlation coefficients across variables. It should be noted that the basic aggregates may take multiple forms and may be reused in various ways depending on the queried statistical measures.

In various embodiments, the data canopy uses a set of segment trees to store the basic aggregates. The segment trees support efficient aggregate queries over a data range without the need to access individual data items. This property is satisfied by storing, at every parent node, an aggregate of its two children. Segment trees in the data canopy may be implemented as binary trees. In one embodiment, the data canopy catalog is implemented as a hash table storing pointers in all segment trees.

The basic aggregates in the data canopy may be built and/or managed in three modes: offline, online, and speculative depending on hardware properties, the size of the base data and/or latency requirements. In the offline mode, if the user knows the base data and statistical measures of interest a priori, the data canopy may construct the library of basic aggregates in advance over various ranges of the base data; the library of basic aggregates may then be stored in the data canopy for later retrieval. In the online mode, the library of basic aggregates is incrementally populated by the data canopy during query processing. For example, the basic aggregates that are needed and thus computed in response to an incoming query may be cached in memory. As more queries are processed, the library of basic aggregates becomes more complete. In various embodiments, the library of basic aggregates is created using a combination of the offline and online modes. For example, the data canopy may generate a library having as many basic aggregates as it allows during the offline mode; and during query processing, data canopy may generate the basic aggregates online to fill in the missing pieces in the library. In some embodiments, data canopy operates in speculative mode, which allows additional basic aggregates in addition to those required by active queries to be speculatively created and maintained; this mode may speed up the population of the library of basic aggregates.

In various embodiments, individual basic aggregates within the library are maintained at a granularity of a data chunk—the smallest logical partition of data that includes consecutive values from a data structure (e.g., a column or a row) in the base data. For every data chunk, the data canopy may store a single value per basic aggregate type. Therefore, when a statistical measure in an incoming query has a data range larger than the chunk size, the queried measure may be synthesized directly from the basic aggregates. If the data range of the queried measure does not exactly align with the chunks, the data canopy needs to scan only two chunks of base data at the edges of the queried range. Accordingly, the use of chunks allows reuse of the basic aggregates between different queries that request statistics on overlapping or partially overlapping data. The chunk size may be optimized based on, for example, properties of the hardware (e.g., cache line size) and/or the type of the requested statistical measure.

In some embodiments, when an incoming query is received, multiple steps are taken to process the incoming query and compute a result in response thereto. First, the data range of the incoming query is mapped to a set of chunks; generally, the entire query range is covered by the subset of chunks. The query range may include two distinct parts—a first part that perfectly aligns with the boundaries of the existing chucks and a second part (typically at the two end-points of the query range, but the second part can be any portion of the query range) that may or may not align with the boundaries of the existing chunks. If the second part of the queried data range does not align with the chunks, the data canopy may scan the base data associated with the second part and compute the basic aggregates corresponding thereto. Subsequently, the statistical measure in the incoming query is mapped to one or more sets of the basic aggregates, which may then be synthesized to generate a result in response to the queried statistical measure.

Accordingly, the data canopy in the present invention provides a smart cache framework that accelerates statistical computations. In various embodiments, the data canopy breaks statistical measures down to their basic aggregates, caches and maintains the basic aggregates within an in-memory data structure, and reuses the basic aggregates to synthesize future computations of the same or different statistical measures on the same or at least partially overlapping data range. Thus, the data canopy advantageously obviates the need to repeatedly access and scan the base data in order to compute queried statistical measures as required in conventional systems. Experimental results show that the latency time using data canopy may be significantly reduced (e.g., by at least a factor of 10) compared to conventional systems used for exploratory statistical analysis. As more queries are computed and stored in the data canopy, the latency time can be further reduced (e.g., by three orders of magnitude). In addition, machine learning and data mining algorithms that directly use statistical aggregates stored in the data canopy may experience a speedup of six orders of magnitude compared to the conventional brute force approach. Such improvement is particularly critical as the base data grows.

The data canopy may be established offline (with some pre-processing) and/or online (with no pre-processing) to speed up computations of queried measures that have overlap on the queried data range and/or on the statistical computations with that of the basic aggregates stored in the data canopy. In addition, the data canopy may be incorporated in many database systems, data science platforms, and data analysis infrastructures that are tailored to different applications. Accordingly, the data canopy may be utilized by data scientists in various data-driven fields, such as in genetics, astronomy, finance, quantitative social science, etc., to provide interactive calculation of statistical measures and accelerate statistical analysis.

Accordingly, in one aspect, the invention pertains to an apparatus for determining statistical properties of data. In various embodiments, the apparatus includes a computer memory for storing (i) a user-supplied statistical query and (ii) multiple basic statistical primitives, each basic statistical primitive corresponding to multiple data chunks and each of the chunks corresponding to the smallest logical partition of data that includes consecutive values of data from a data structure; and a computer processor configured to process the statistical query to identify one or more statistical computations and one or more data ranges corresponding to the statistical computation(s); map the data range(s) to a subset of the data chunks; map the statistical computation(s) to a subset of the basic statistical primitives; perform the statistical computation(s); and respond to the statistical query with the statistical computation(s). The statistical computation(s) may be based at least in part on the subset of data chunks and the subset of basic statistical primitives to thereby reduce a latency response time to the statistical query.

In various embodiments, the basic statistical primitives are computed prior to processing the received statistic query and/or during process of the received statistic query. In addition, the basic statistical primitives may be stored as a set of segment trees (e.g., binary trees). In one embodiment, each segment tree is associated with a pointer stored in the computer memory, and the computer processor is further configured to follow the pointers to access the corresponding segment trees for retrieving the basic statistical primitives.

Further, the data range(s) may include the first portion that aligns with boundaries of the subset of the data chunks and the second portion that does not align with boundaries of the subset of the data chunks; the processor may be further configured to (i) access data associated with the second portion, (ii) compute one or more new basic statistical primitives corresponding to the data associated with the second portion, and (iii) perform the statistical computation(s) based at least in part on the new basic statistical primitive(s). In some embodiments, the computer processor is further configured to compute the first query cost associated with (i) accessing the data associated with the second portion of the data range(s) and (ii) accessing the segment trees associated with the subset of the basic statistical primitives; compute the second query cost associated with accessing data associated with the first and second portions; and determine a critical range size based at least in part on the first and second query costs. In addition, the computer processor may be further configured to compare the data range(s) to the determined critical range size; and if the data range(s) is smaller than the determined critical range size, access data associated with the data range(s) and, based thereon, perform the statistical computation(s).

In various embodiments, the computer processor is further configured to determine an optimal size of the chunks based at least in part on a number of segment trees associated with the first portion of the data range(s). In addition, the computer processor is further configured to determine an optimal depth of the segment trees based at least in part on the optimal size of the chunks; and perform the statistical computation(s) based at least in part on the basic statistical primitives associated with the segment trees within the determined optimal depth. In one embodiment, the computer memory further stores an eviction policy and the processor is further configured to evict a portion of the stored basic statistical primitives and/or a portion of the data in the data structure from the computer memory based on the eviction policy.

In another aspect, the invention relates to a method of determining statistical properties of data. In various embodiments, the method includes storing, in a computer memory, multiple basic statistical primitives, each basic statistical primitive corresponding to multiple data chunks and each of the chunks corresponding to the smallest logical partition of data that includes consecutive values of data from a data structure; receiving a statistical query from a user; processing the received statistical query to thereby identify one or more statistical computations and one or more data ranges corresponding to the statistical computation(s); computationally mapping the data range(s) to a subset of the data chunks; computationally mapping the statistical computation(s) to a subset of the basic statistical primitives; performing the statistical computation(s); and responding to the statistical query with the statistical computation(s). The statistical computation(s) may be based at least in part on the subset of data chunks and the subset of basic statistical primitives to thereby reduce a latency response time to the statistical query.

In various embodiments, the basic statistical primitives are computed prior to processing the received statistic query and/or during process of the received statistic query. In addition, the basic statistical primitives may be stored as a set of segment trees (e.g., binary trees). In one embodiment, each segment tree is associated with a pointer stored in the computer memory; the method further includes following the pointers to access the corresponding segment trees for retrieving the basic statistical primitives.

Further, the data range(s) may include the first portion that aligns with boundaries of the subset of the data chunks and the second portion that does not align with boundaries of the subset of the data chunks; the method further includes (i) accessing data associated with the second portion, (ii) computing one or more new basic statistical primitives corresponding to the data associated with the second portion, and (iii) performing the statistical computation(s) based at least in part on the new basic statistical primitive(s). In some embodiments, the method further includes computing the first query cost associated with (i) accessing the data associated with the second portion of the data range(s) and (ii) accessing the segment trees associated with the subset of the basic statistical primitives; computing the second query cost associated with accessing data associated with the first and second portions; and determining a critical range size based at least in part on the first and second query costs. In addition, the method may further include comparing the data range(s) to the determined critical range size; and if the data range(s) is smaller than the determined critical range size, accessing data associated with the data range(s) and, based thereon, performing the statistical computation(s).

In various embodiments, the method further includes determining an optimal size of the chunks based at least in part on a number of segment trees associated with the first portion of the at least one data range. In addition, the method may further include determining an optimal depth of the segment trees based at least in part on the optimal size of the chunks; and performing the statistical computation(s) based at least in part on the basic statistical primitives associated with the segment trees within the determined optimal depth. In one embodiment, the method further includes storing an eviction policy in the computer memory further; and evicting a portion of the stored basic statistical primitives and/or a portion of the data in the data structure from the computer memory based on the eviction policy.

As used herein, a data range refers to a set of consecutive data items from a column or a set of columns of the base data. A query range refers to a data range over which a query requests a statistical measure. In addition, the term "data structure" means any format for organizing and storing data for subsequent access, including column-wise and row-wise storage formats. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which:

FIG. 3A depicts mapping of a statistical measure to basic aggregates in accordance with various embodiments;

FIG. 3B illustrates exemplary breakdowns of a set of statistical measures into various basic aggregates in accordance with various embodiments;

FIG. 4A depicts an exemplary data structure of the data canopy over a single column in accordance with various embodiments;

FIG. 4B illustrates a comparison of the memory requirement and query cost of various configurations of segment trees;

FIG. 4C depicts a list of terms and the descriptions associated with the data canopy used herein;

DETAILED DESCRIPTION

Figure 1:
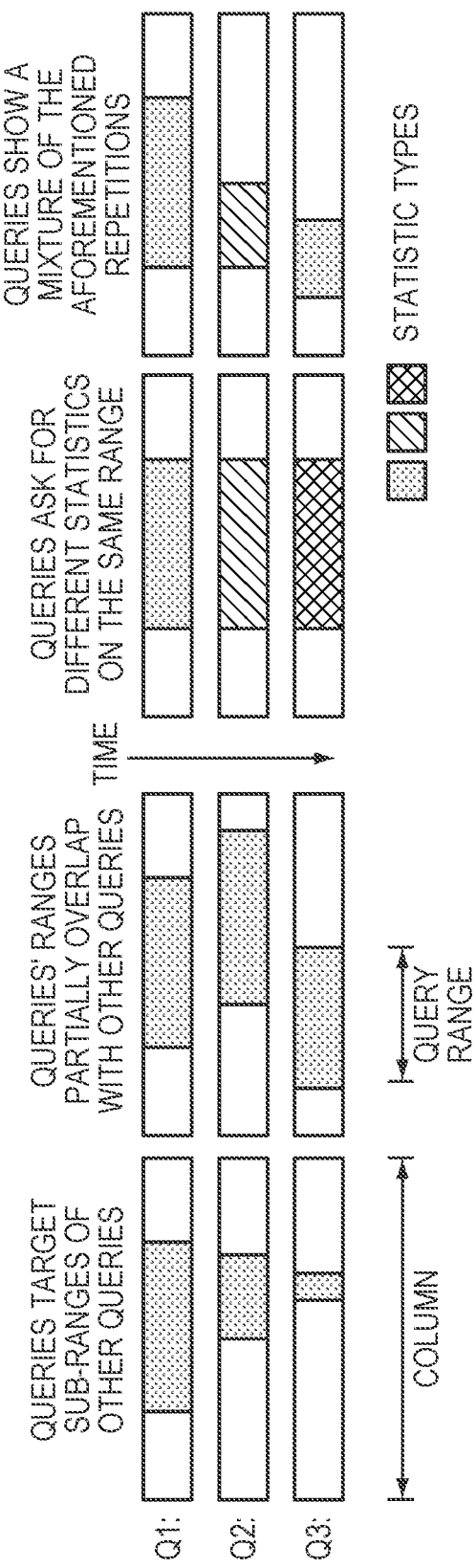
FIG. 1 depicts different forms of repetitions for various queries of a statistical measure on a given data range.
Figure 2A:
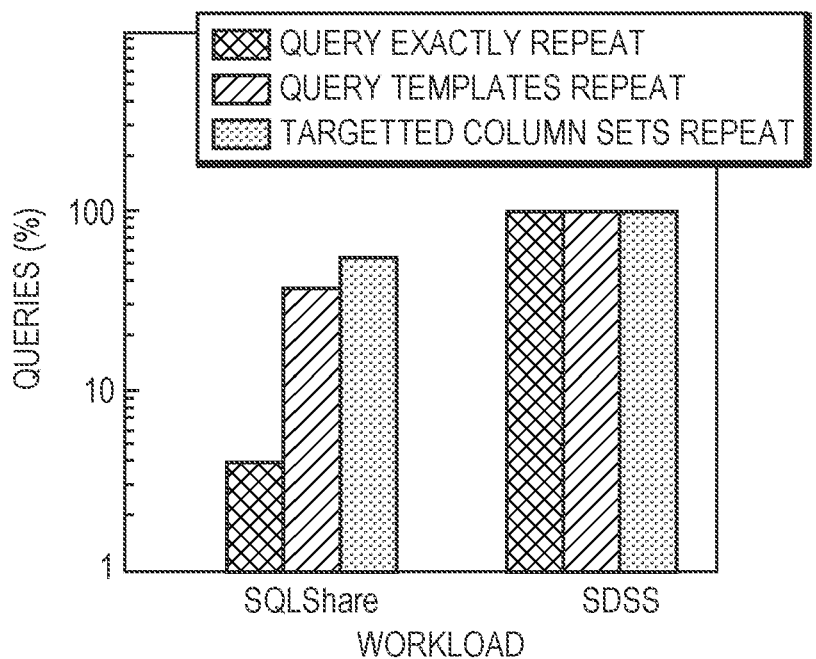
FIG. 2A depicts repetitive statistical calculations in various exploratory workloads.
Figure 2B:
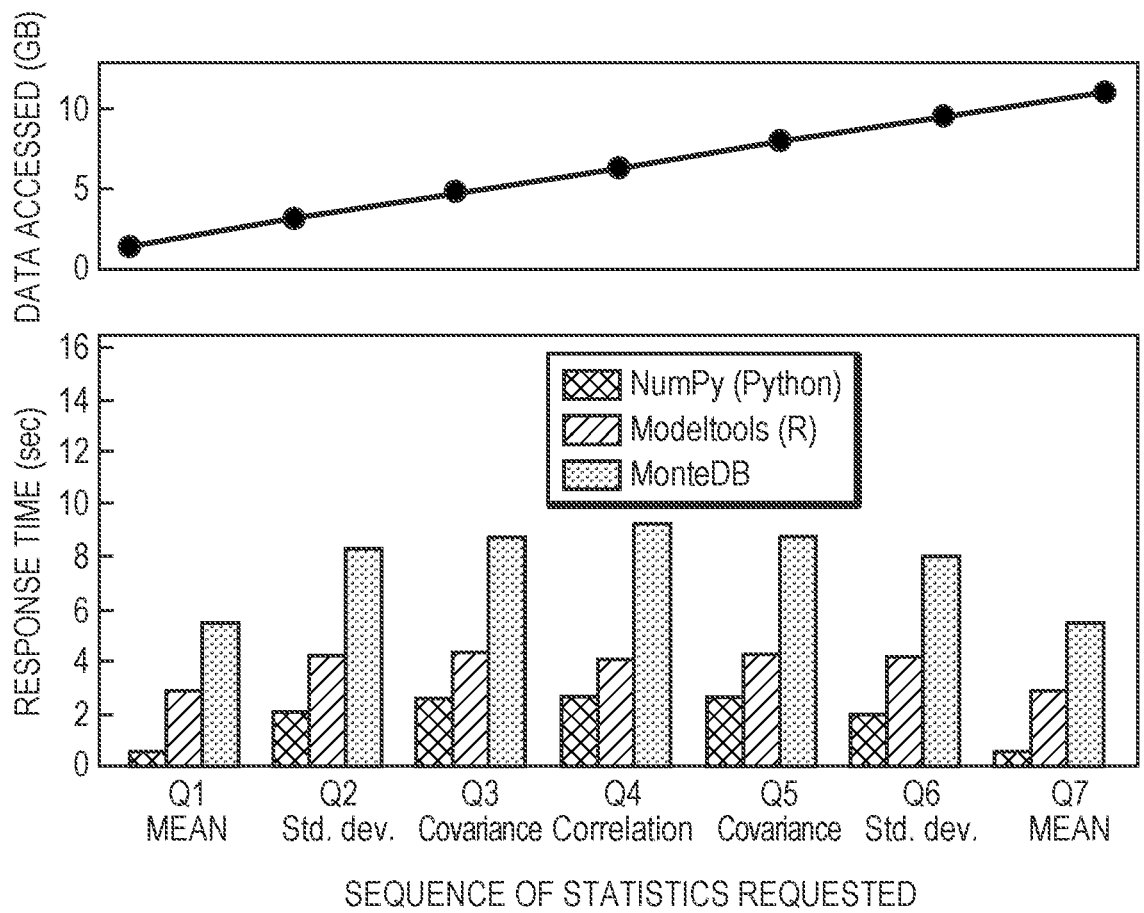
FIG. 2B depicts query-response times (bottom) and the amount of accessed data (top) required by conventional tools for computing various statistical measures.

Embodiments of the present invention relate to a data canopy that advantageously allows data analysts to perform exploratory statistical analysis without the need of repeatedly accessing the entire base data. The critical concept is that the data canopy breaks statistical measures down to basic aggregates (or basic primitives), and caches and manages them in a library within an in-memory data structure. The library of basic aggregates may then be accessed by an incoming query to compute a statistical measure associated therewith. The data canopy may create and/or use the library of basic aggregates in a single offline pass over the data, online during query processing and/or in a speculative manner for creating and maintaining additional basic aggregates in addition to those required by active queries as further described below.

A. Concepts of the Data Canopy

1) Basic Aggregates

In various embodiments, a basic aggregate over a data range is defined as a value obtained by first performing a transformation τ on every data item in that data range and then combining the results using an aggregation function $f$. Thus, a basic aggregate can be represented as $f(\{\tau(x_i)\})$, where $x_i$ represents data items in a data range X.

The transformation τ may be any operation on an individual data item, and the aggregation function $f$ may be commutative and associative so as to allow combinations of the basic aggregates between sub-ranges (i.e., partitions of the data range X). Thus, for any partition $\{X_1, X_2, \ldots, X_n\}$ of the data range X, $f(X)$ can be written as:

$$f(x)=f(\{f(x_1),f(x_2) \ldots f(x_n)\}) \qquad \text{Eq. (1).}$$

Accordingly, the aggregation function $f$ may be, for example, the minimum ("min"), maximum ("max"), count, summation ("sum"), or any product function on any given data range, but it cannot be the median.

2) Decomposing Statistics

The data canopy may define a statistical measure S over the data range X as a function, F, of various basic aggregates:

$$S(X)=F(\{f(\tau\{x_i\})\}) \qquad \text{Eq. (2).}$$

FIG. 3A depicts mapping of a statistical measure S (with function F) to two basic aggregates. Representing the statistical measure as a function of the basic aggregates may advantageously allow various statistical measures to share and thereby reuse the basic aggregates. For example, the mean, variance, and standard deviation all require the basic aggregate of summation over the target data. In addition, a given basic aggregate over a certain data range (as a result of the property in Eq. (1)) may be further decomposed into sub-ranges of the data; by combining the sub-ranges, the basic aggregate over any data range may be simply obtained.

FIG. 3B illustrates exemplary breakdowns of a set of statistical measures into five basic aggregates in accordance with various embodiments. The basic aggregates may then be cached in memory and accessed by a new query at a later time. For example, the new query may be a geometric mean $\tau(x)=x$, $f(X)=\Pi_i x_i$ or a harmonic mean $$\tau(x) = \frac{1}{x}, f(X) = \sum_i x_i$$

that can be directly computed based on the basic aggregates.

Alternatively, the data canopy may cache the resulting values of each individual statistical measure; but because this approach may not be able to reuse computation and data access between different statistical measures despite overlaps therebetween, it is less preferred. In addition, because more than 90% of the statistical measures supported by NumPy and SciDB-Py and more than 75% of the statistical measures supported by Wolfram can be decomposed into one or more basic aggregates illustrated in FIG. 3B, caching the basic aggregates associated with the statistical measures (as opposed to caching the computed values of the statistical measures) may advantageously eliminate the time of accessing the base data again for computing the individual statistical measures, thereby significantly reducing the response times to queries in the database.

3) Chunks

In various embodiments, individual basic aggregates within the library are maintained at a granularity of a data chunk—the smallest logical partition of data that includes consecutive values from a data structure (e.g., a row or a column) in the base data. The chunk size may be optimized based on, for example, properties of the hardware (e.g., cache line size) and/or the type of the requested statistical measure as further described below. For every data chunk, the data canopy may store a single value per basic aggregate type. Therefore, when a statistical measure in an incoming query has a data range larger than the chunk size, the queried measure may be computed directly from the basic aggregates. If the data range of the queried measure does not exactly align with the chunks, the data canopy may need to scan only two chunks of base data at the edges of the queried range. In a similar fashion, queries having partial range overlaps with previously computed chunks may also reuse the basic aggregates. Accordingly, the use of chunks allows reuse of the basic aggregates between different queries that request the same or different statistical measures on overlapping or partially overlapping data.

B. Data Structure of the Data Canopy

In various embodiments, the data canopy uses a set of segment trees (e.g., binary trees) to store the basic aggregates in a database in memory. The segment trees may support efficient aggregate queries over a data range without the need of accessing individual data items. For example, the data canopy may store, at every parent node, an aggregate of its two children. Alternatively, the data canopy catalog may be implemented as a hash table storing pointers in all segment trees. Utilization of the segment-tree data structure may advantageously enable the data canopy to aggregate over chunks that fall within a queried data range. In this way, the data canopy may promptly compute statistical measures even when a logarithmic number of chunks is involved.

In one embodiment, the data canopy maintains a separate segment tree for each basic aggregate kept for each column; each leaf of this segment tree stores a basic aggregate value corresponding to a chunk. FIG. 4A is an exemplary data structure of the data canopy over a single column. In this layout, the data canopy holds two basic aggregates (i.e., the sum and sum of squares) using two separate segment trees, one for each basic aggregate. By having a separate set of segment trees for each column, the internal nodes of each segment tree may be ensured to include no surplus nodes (i.e., the nodes that maintain aggregates across columns or across statistical measures). As a result, the overall memory requirement of the data canopy as well as the size of the individual segment trees may be minimized.

In addition, because range queries are typically localized to a single column or a set of columns (for multivariate statistical measures), utilizing the separate segments trees may advantageously allow the data canopy to search through only a subset of the total segment trees (as opposed to searching one big segment tree corresponding to the entire base data), thereby reducing the response time and accessed data. This arrangement may also allow the data analysist or application to request individual statistical measures and combine them in any suitable manner according to the domain and/or the data set. FIG. 4B illustrates a comparison of the memory requirement and query cost of various configurations of segment trees, and FIG. 4C depicts a list of terms and the descriptions associated with the data canopy used herein. As shown, the configuration used in the data canopy (bottom row) has the lowest query cost and memory usage.

Further, separation of the segment trees may allow for maximum flexibility in dynamic and exploratory workloads. This is because the data canopy may be easily extended by adding new segment trees to allow for new columns or new basic aggregates without the need of constructing or even allocating memory for the entire data canopy in advance. Finally, the construction of the data canopy may be aggressively parallelized as the process of calculating the basic aggregates and storing them may be parallel. In one embodiment, a univariate data canopy is constructed by dividing the columns between the number of available hardware threads. In addition, a multivariate data canopy may be constructed by independently building the segment trees for every combination of the columns.

C. Operating Modes

The basic aggregates in the data canopy may be built and/or managed in three modes: offline, online, and speculative depending on hardware properties, the size of the and/or latency requirements as further described below.

1) Offline Mode

In the offline mode, the data canopy may construct the library of basic aggregates in advance over various ranges of the base data (e.g., for a set of columns) based on statistical measures specified by the users; the library of basic aggregates may then be stored in the data canopy for later retrieval. This mode is suitable if users know the data and statistical measures of interest a priori and can also wait for the data canopy to be built before posing their queries.

2) Online Mode

In the online mode, the data canopy populates the library of basic aggregates incrementally online during query processing. In various embodiments, the data canopy generates and caches the basic aggregates needed for every incoming query if they do not already exist in the library. For example, upon receiving and decomposing a queried statistical measure, the data canopy may search the library for the basic aggregates required for computing the statistical measure. If the basic aggregates are found in the library, the data canopy may retrieve it for computation. If, however, the basic aggregates are not found in the library, the data canopy may generate and store them in the library. As more queries are processed, the library of basic aggregates becomes more complete; this may reduce data access costs for future queries with higher probability.

In some embodiments, the library of basic aggregates is created using a combination of the offline and online modes. For example, the data canopy may generate a library having basic aggregates corresponding to every portion of the base data for every possible statistical measure during the offline mode. The amount of the basic aggregates generated during the offline mode may be determined by the idle time specified by the user. During query processing, the data canopy may operate in online mode to generate other basic aggregates and then add them to the library to reduce the number of missing aggregates therein.

3) Speculative Mode

In the speculative mode, the data canopy may take full advantage of moving the data through the memory hierarchy to generate additional basic aggregates besides those required by active queries to be speculatively created and maintained. In some embodiments, the data canopy builds segment trees for all univariate statistical measures when scanning a portion of the base data for answering the current query; the built segment trees may then be stored and retrieved at a later time to avoid rescanning the data for future queries of other statistical measures. For example, when the data canopy answers a mean query in the speculative mode, it may also build a segment tree for sums of squares, which can then be utilized to compute the variance and standard deviation later.

Figure 5:
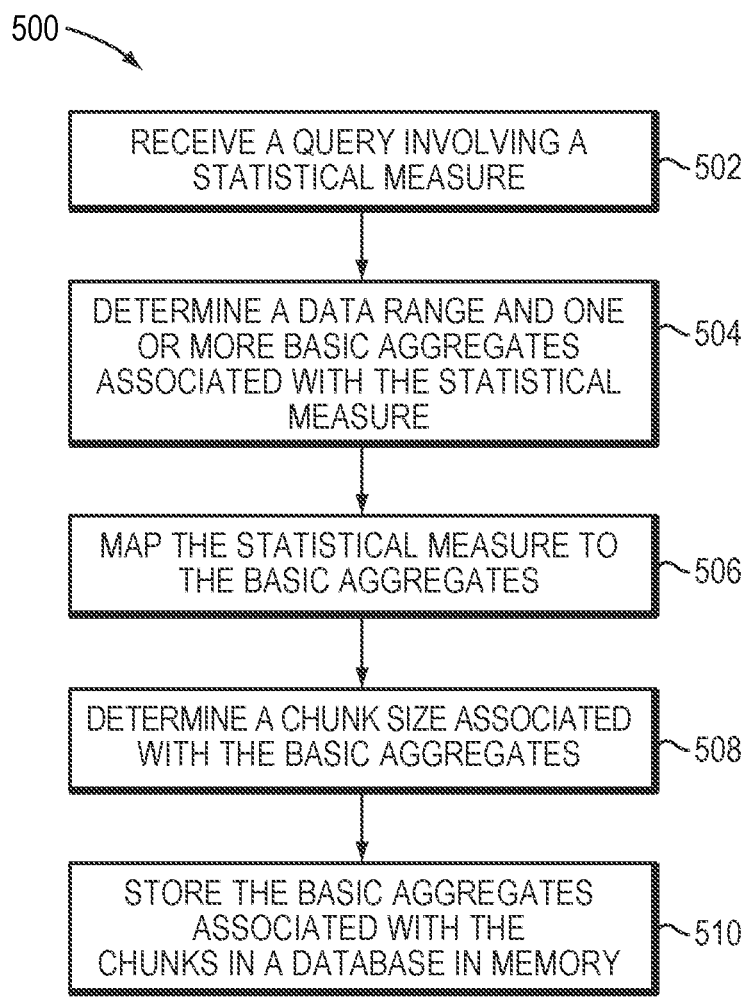
FIG. 5 is a flow chart of an approach for constructing a library of basic aggregates using the data canopy in accordance with various embodiments.

FIG. 5 is a flow chart of an approach 500 for constructing a library of basic aggregates using the data canopy in accordance with various embodiments. In a first step 502, a query involving a statistical measure is received. In a second step 504, the data canopy may determine a data range and one or more basic aggregates associated with the statistical measure. In a third step 506, the data canopy may map the statistical measure to the basic aggregates. In a fourth step 508, the data canopy may determine a chunk size associated with the basic aggregates. In a fifth step 510, the data canopy may store the basic aggregates in a database in memory for retrieval later.

D. Query Processing

After the library of basic aggregates are built in the offline mode (or not built in advance if operating in the online mode), the data canopy may process an incoming query as further described below to compute the statistical measure associated therewith.

1) Convert Query to a Plan

Figure 6A:
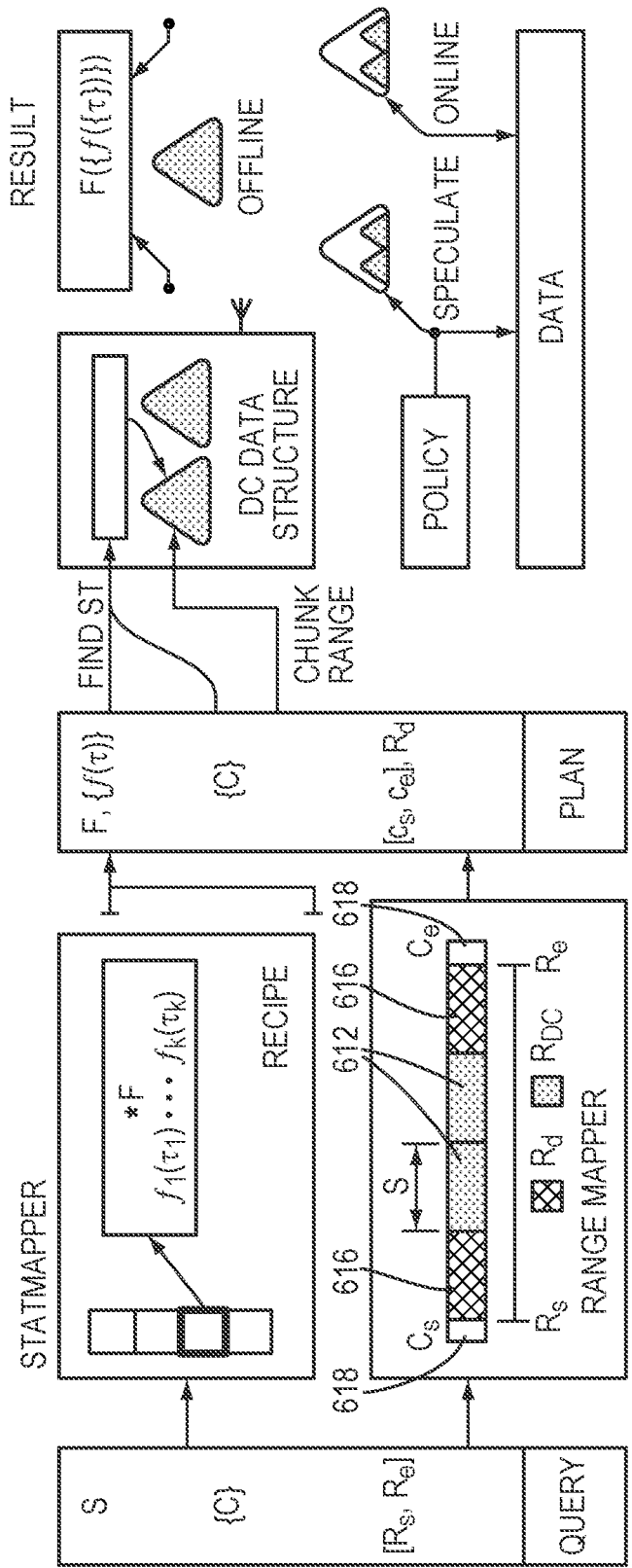
FIG. 6A depicts an exemplary approach for processing a statistical query in the data canopy in accordance with various embodiments.
Figure 6B:
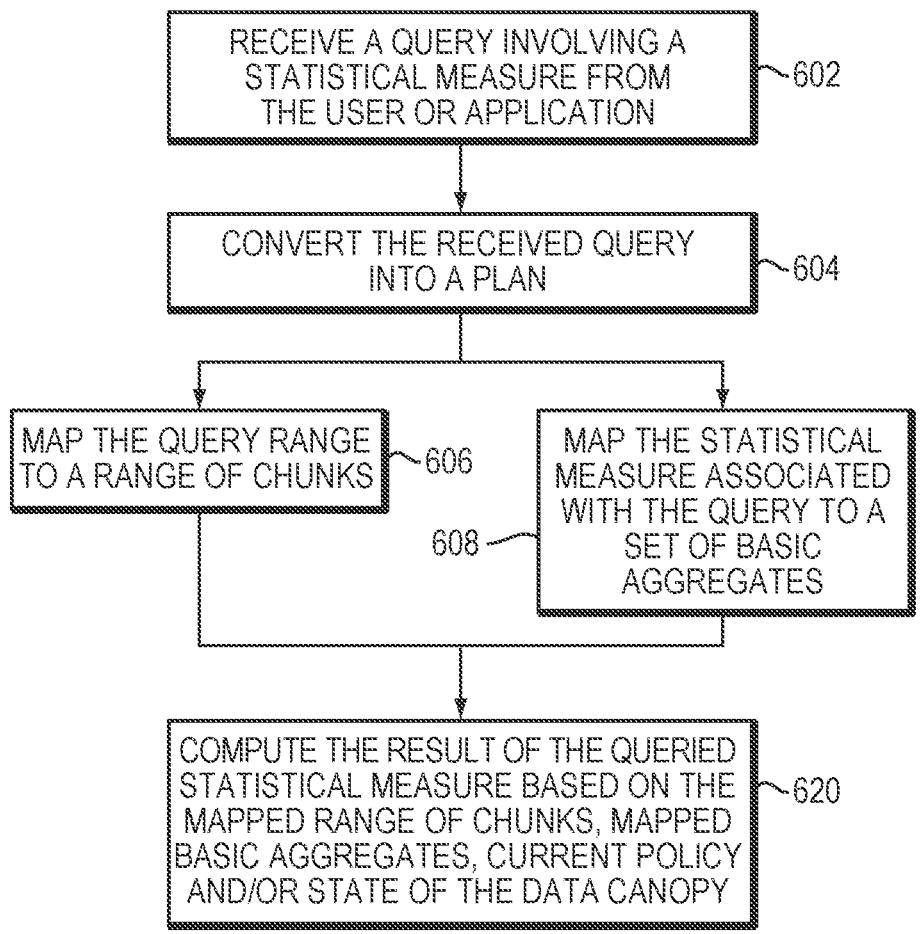
FIG. 6B is a flow chart of an approach for processing a statistical query in the data canopy in accordance with various embodiments.

In one embodiment, a query in the data canopy is defined by a set Q={{C}, [$R_s$, $R_e$), S}; where {C} represents the set of columns targeted by the query; $R_s$ and $R_e$ define a query range i.e., the two positions in the column set C for which a statistical measure is requested; and S is the statistical measure to be computed. FIGS. 6A and 6B depict the steps for processing a query in accordance with various embodiments. In a first step 602, the data canopy receives a query from the user or application. The data canopy may then convert the received query into a plan (step 604). In one implementation, the plan is established by mapping the query range to a range of chunks (step 606), and mapping the statistical measure associated with the query to a set of basic aggregates (step 608).

2) Mapping Query Range to Chunks

In various embodiments, the data canopy first maps the query range [$R_s$, $R_e$) to a set of chunks [$C_s$, $c_e$] such that the whole query range is covered by the chunks. For example, referring again to FIG. 6A, the first portion, $R_{CD}$, 610 of the query range aligns perfectly with the boundaries of the existing chunks 612. In this case, the data canopy may use the basic aggregates of these chunks 612 to compute the result. If the second portion, $R_d$, 616 of the query range at the two end-points of the query range also align with the existing chunks 618, the basic aggregates of the end-point chunks 618 may also be used by the data canopy for computing the values associated with the queried statistical measure. If, however, the second portion 616 of the query range does not align with the existing chunks 618, the data canopy may scan the base data associated with the two chunks 618 at the end-points of the query range and compute the basic aggregates associated therewith. As used herein, the portion 616 of the query range requiring access to the base data during query processing is referred to as a residual range. In some embodiments, there are missing chunks in a portion of the query range when the data canopy operates in online mode; thus, the data canopy may access the base data associated with these missing chunks during the online mode so as to populate any necessary basic aggregates for computing the queried statistical measure.

3) Mapping Statistical Measure to Basic Aggregates

The next step is to map the queried statistical measure S to the corresponding set of basic aggregates {$f(\tau)$} and use a function F to combine these basic aggregates. In one embodiment, this is achieved by "StatMapper" as depicted in FIG. 6A. For every statistical measure supported by the data canopy, the StatMapper may store a complete recipe to compute the statistical measure from the basic aggregates. In one embodiment, the StatMapper is implemented as a hash table in memory; the keys are identifiers of the statistical measures and each key corresponds to a recipe. The recipe may be a data structure that includes a list of basic aggregates {$f(\{\tau\})$} required to compute the statistical measure S as well as a pointer to a function that operates on and combines the basic aggregates as defined by F. Thus, the data canopy converts a query Q into a plan P by making the following set of mappings:

$$\{\{C\},[R_e,R_e),S\} \rightarrow \{\{C\},[c_s,c_e],R_d,\{f(\{\tau\})\},F\} \qquad \text{Eq. (3)}.$$

4) Evaluation of the Plan

Referring again to FIGS. 6A and 6B, the established plan may then be passed on to an evaluation engine which may then compute the result of the queried statistical measure based on the mapped range of chunks, mapped basic aggregates, current policy (e.g., a three-phase eviction policy described below) and/or mode of operation of the data canopy (step 620). For example, if the data canopy operates in the offline mode, because all basic aggregates have been precomputed, there is no need to touch the base data, except for evaluating the residual range $R_d$. In this mode, no new basic aggregates may be added when processing a query. In the online and the speculative modes, however, some of the required basic aggregates (e.g., for some chunks) may not be computed and stored in advance in the library. In such cases, the data canopy may access the base data to evaluate the basic aggregates on these chunks, and the basic aggregates may be stored in the data canopy. Finally, when all basic aggregates required for the current queried statistical measure are fetched and/or materialized, they may be passed to function F to generate the result.

E. Analyzing Query Cost

The cost of answering a query when both the base data and data canopy fit in the memory may be modeled in terms of the amount of data accessed (e.g., cache lines). To simplify the cost estimation, the cost of a cache miss (e.g., traversing the linked segment trees) and the cost of a cache hit (e.g., scanning a sequential residual range) may be considered together. Typically, an incoming query q requests a statistical measure S over a data range. The statistical measure S may be defined over k different columns and composed of b total basic aggregates—i.e., it accesses b segment trees. For example, in the case of a variance query, b=2 (including sum and sum of squares) and k=1 (univariate statistic); whereas for a correlation query b=5 (including sum and sum of squares of both columns and sum of products) and k=2 (bivariate statistic). The total cost, $C_{syn}$, of answering the query q may include two parts—the cost, $C_{st}$, of probing b segment trees and the cost, $C_r$, of scanning the residual ranges of the k columns. As a result, $C_{syn}$, can be computed as:

$$C_{syn} = C_{st} + C_r \qquad \text{Eq. (4)}.$$

To answer a query q, the data canopy may first traverse b segment trees; the number of leaves in each segment tree is $r \cdot v_d/s$, where r represents the number of rows, $v_d$ represents the record size (in bytes), and s represents the chunk size (in bytes). Because the cost of probing a segment tree with n leaves is at most (2 log n) cache line reads (as a node fits in a cache line), $C_{st}$ may be expressed as follows:

$$C_{st} = 2 \cdot b \cdot \log_2\left(\frac{r \cdot v_d}{s}\right). \qquad \text{Eq. (5)}$$

The data canopy may then scan the residual ranges of the k columns. For a query on k columns, at most 2k chunks (i.e., at the end points of the query range) may be scanned. The cost of scanning a chunk is s/#, where # represents a cache line size (bytes). Thus, the cost $C_r$ may be expressed as follows:

$$C_r = \frac{2 \cdot k \cdot s}{\#}. \qquad \text{Eq. (6)}$$

The total cost, $C_{syn}$, of answering the query q may be computed as:

$$C_{syn} = \frac{2 \cdot k \cdot s}{\#} + 2 \cdot b \cdot \log_2\left(\frac{r \cdot v_d}{s}\right). \qquad \text{Eq. (7)}$$

For a query having a small range, the query cost of directly scanning the data base may be smaller than the cost of traversing the segment trees. Thus, the data canopy may compare the two types of costs and determine which approach to take based on the comparison. In various embodiments, the cost, $C_{scan}$, of scanning the full query range of size R is estimated as:

$$C_{scan} = \frac{R \cdot v_d}{\#}. \qquad \text{Eq. (8)}$$

The boundary query range size, $R_b$, that results in $C_{scan}$ equal to $C_{syn}$ can then be computed as:

$$R_b = \frac{2 \cdot k \cdot s}{v_d} + \frac{2}{v_d} \cdot \# \cdot b \cdot \log_2\left(\frac{r \cdot v_d}{s}\right). \qquad \text{Eq. (9)}$$

Figure 7:
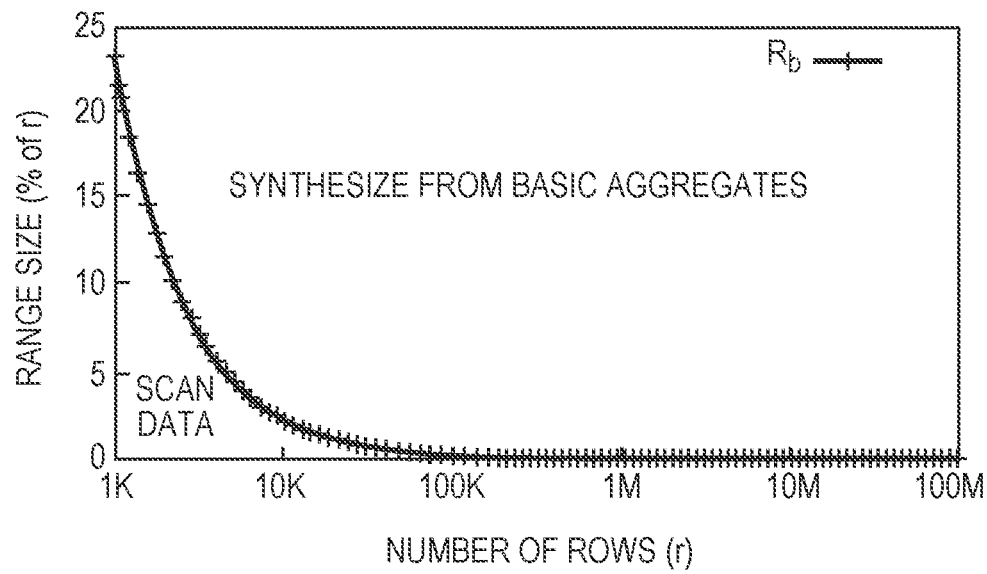
FIG. 7 depicts a relationship between the number of rows in the base data and the proportion of total queries answered using basic aggregates in accordance with various embodiments.

Therefore, if the size of the full query range is larger than $R_b$, the data canopy may answer the query using the basic aggregates stored in the library. If, however, the size of the full query range is smaller than $R_b$, the data canopy may answer the query by directly scanning the full query range of the base data. FIG. 7 depicts how $R_b$ (as a percentage of the number of rows r) decreases as r increases, where #=64B, b=5, k=2, and $v_d$=4B. As depicted, the proportion of the total queries answered using the basic aggregates positively correlates to the number of rows in the base data.

F. Selecting the Chunk Size

In various embodiments, the data canopy determines an optimal chunk size based on approaches as further described below so as to optimize the query performance.

1) Optimal Chunk Size

Figure 8:
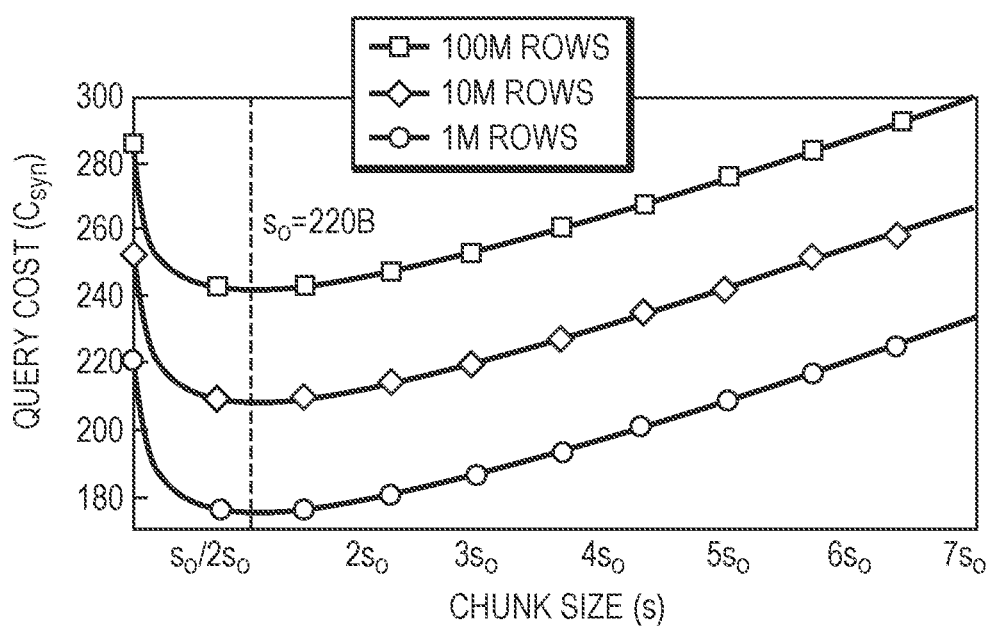
FIG. 8 illustrates an exemplary convex behavior of a query cost when varying a chunk size in accordance with various embodiments.

The chunk size may reflect a trade-off between the cost of scanning the residual range $C_r$ and the cost of traversing segment trees $C_{st}$. For example, increasing the chunk size may result in an increase of $C_r$ as the residual range increases. In contrast, increasing the chunk size may decrease $C_{st}$ as the size of segment trees shrinks. As a result, the cost $C_{syn}$ may be a convex function of the chunk size and have a global minimum value—i.e., there is an optimal chunk size that optimizes the cost of answering a query. FIG. 8 illustrates an exemplary convex behavior of the query cost (having #=64B; b=5; k=2).

Thus, to obtain an optimal chunk size, $s_o$, the cost $C_{syn}$ may be differentiated with respect to s:

$$s_o = \frac{b \cdot \#}{k \cdot \ln 2}. \qquad \text{Eq. (10)}$$

As depicted in Eq. (10), the optimal chunk size so depends only on properties of the hardware (e.g., the cache line size, #) and the type of requested statistical measure (e.g., the ratio between the number of segment trees, b, and the columns, k, that are scanned for the residual range). The determined optimal chunk size strikes a balance between the number of cache lines accessed when scanning the base data (for the residual range) and when traversing the segment trees.

2) Optimal Chunk Size and $R_b$

Eq. (9) indicates that $s<R_b$, $\forall r \geq s$. In other words, any chunk size (including the optimal chunk size so) is always smaller than the boundary range size $R_b$ (below which the query is answered by scanning the range). In addition, because the data canopy may answer any query having a smaller range size than so by directly scanning the range instead of traversing the segment trees, the chunk size is preferred to be equal to or larger than so, independent of the workload.

3) Selecting the Chunk Size

In various embodiments, the data canopy by default sets the chunk size $s_{DC}$ to the lowest value of the ratio b/k. This value may be 1 (e.g., for b=k=1) and allows the data canopy to store sufficient information (e.g., sufficient depth in the segment trees as further described below) to be optimal for queries that access the least amount of segment trees (e.g., mean, max, min etc.). Thus, the data canopy may require no prior knowledge of the workload or the data to set the default chunk size.

4) Workload Adaptivity

Figure 9A:
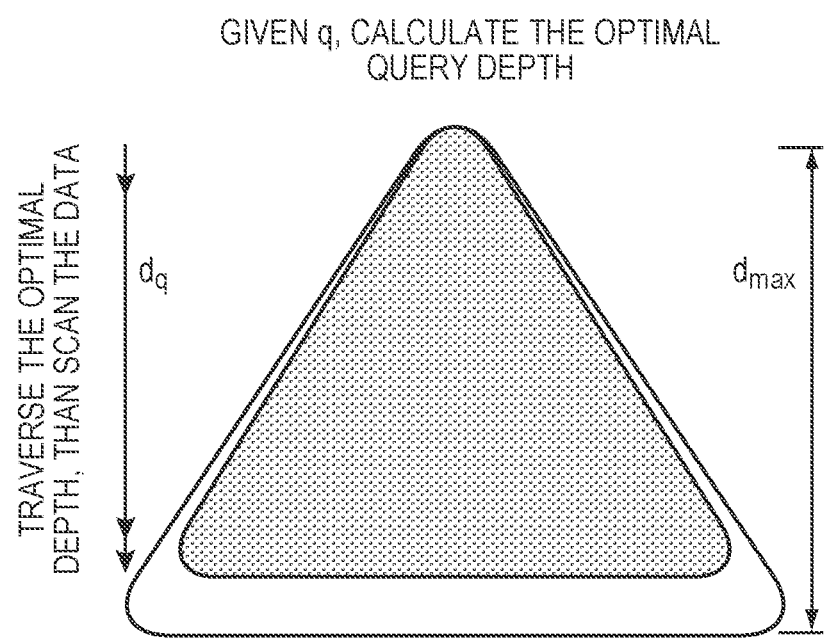
FIG. 9A depicts an optimal depth of segment trees that the data canopy traverses for answering a requested statistical measure in accordance with various embodiments.

In addition, to ensure optimal performance for queries with b/k>1 (i.e., accessing more than one segment tree), the data canopy may make an adaptive decision and traverse shorter paths in the segment trees as depicted in FIG. 9A. For example, for a query q, the data canopy may first analytically compute the optimal chunk size for this query $s_q$ using Eq. (10) and then calculate the optimal depth of the segment tree for q:

$$d_q = \log_2\left(\frac{r \cdot v_d}{s_q}\right).$$  Eq. (11)

The data canopy may go only as deep as $d_q$ in the segment trees, and then scan the residual range (now up to a size of $2 \cdot k \cdot s_q$). This approach ensures that each query achieves optimal performance by minimizing the data (i.e., cache lines) it has to read.

Accordingly, the data canopy may build segment trees with a chunk size that guarantees optimality for queries that need to access a single segment tree only (i.e., $d_{max}$) and may afford to have more cache misses going all the way to the leaves of the segment tree. For queries that access more segment trees (and thus may incur more cache misses), the data canopy may adaptively get out of the segment tree traversal sooner (e.g., at $d_q$) reverting to sequentially scanning more data chunks and thus achieving an optimal balance tailored to each individual query. This optimization results from the fact that the segment trees are binary trees and every node that the data canopy reads when traversing the tree leads to a cache miss. As such, there is a point when reading a cache line full of useful data (e.g., when scanning data chunks) becomes better (e.g., have a less cost) than traversing a binary tree. In one embodiment, instead of performing the optimization described above, the data canopy may determine a more cache conscious layout of the segment trees where every cache miss would bring a cache line full of useful tree data.

Figure 9B:
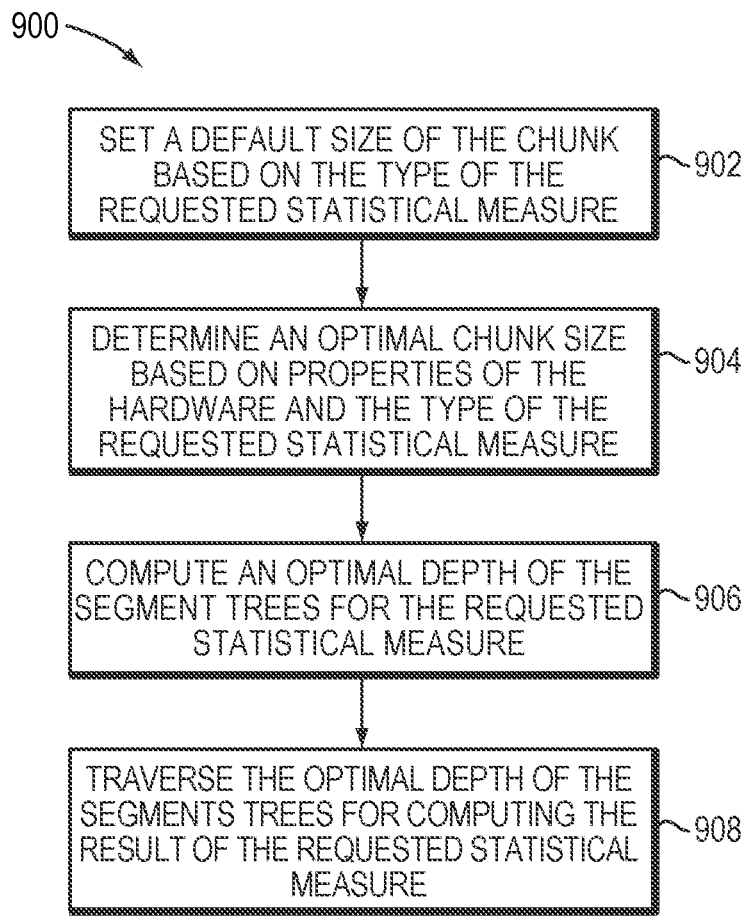
FIG. 9B is a flow chart of an approach for optimizing performance of the data canopy in accordance with various embodiments.

FIG. 9B is a flow chart illustrating an approach 900 for optimizing performance of the data canopy in accordance with various embodiments. In a first step 902, the data canopy may set a default chunk size based on the type of the requested statistical measure (e.g., the lowest value of the ratio b/k). In a second step 904, the data canopy may determine an optimal chunk size based on properties of the hardware (e.g., the cache line size, #) and the type of the requested statistical measure. In a third step 906, the data canopy may compute an optimal depth of the segment trees for the requested statistical measure. In a fourth step 908, the data canopy may traverse the determined optimal depth of the segments trees and, based on the basic aggregates associated therewith, compute a result of the requested statistical measure.

5) Memory Requirement

The memory requirement for the data canopy may depend on the types of the statistical measure it maintains, the chunk size, and/or the data size. In various embodiments, for a given set of statistical measures, S, the data canopy footprint $\mathcal{F}(s)$ is defined as the number of segment trees per column required to compute S on the entire data set. The size (in bytes) of a full segment tree with the optimal chunk size so and node size $v_{st}$ may be given by:

$$v_{st} \cdot \left(2 \frac{r \cdot v_d}{s_o} - 1\right).$$  Eq. (12)

Therefore, the total size of a complete data canopy (in bytes) on c columns is:

$$|DC(s)| = c \cdot v_{st} \cdot \left(2 \cdot \frac{r \cdot v_d}{s} - 1\right) \cdot \mathcal{F}(s).$$  Eq. (13)

In various embodiments, the data canopy footprint of univariate statistical measures is independent of the number of columns c. This is because to compute univariate statistical measures on a column, no information from other columns is required. For example, the data canopy footprint of mean is 1 because only the sum for every column is needed to compute the mean. Similarly, the data canopy footprint of variance and standard deviation is 2.

The data canopy footprint of bivariate statistical measures, however, may depend on the number of columns c, as the bivariate statistical measures require information from pairs of columns. For example, to compute all pairwise correlations, it is required to keep sums and sums of squares of all c columns as well as $c \cdot (c-1)/2$ sums of pairwise products—i.e., a total of $(2+(c-1))/2$ basic aggregates per column.

The data canopy footprint may be similarly defined for a set of statistical measures. For example, the data canopy footprint of mean and variance is 2; whereas the data canopy footprint of standard deviation, mean, and correlation is $(2+(c-1))/2$. Using the terms defined in FIG. 4C, the size of the data canopy storing a set of statistical measures S is:

$$|DC(s)| = c \cdot v_{st} \cdot (2 \cdot h - 1) \cdot \mathcal{F}(s) \cdot v_{st}$$  Eq. (14).

G. Out-of-Memory Processing

Figure 10:
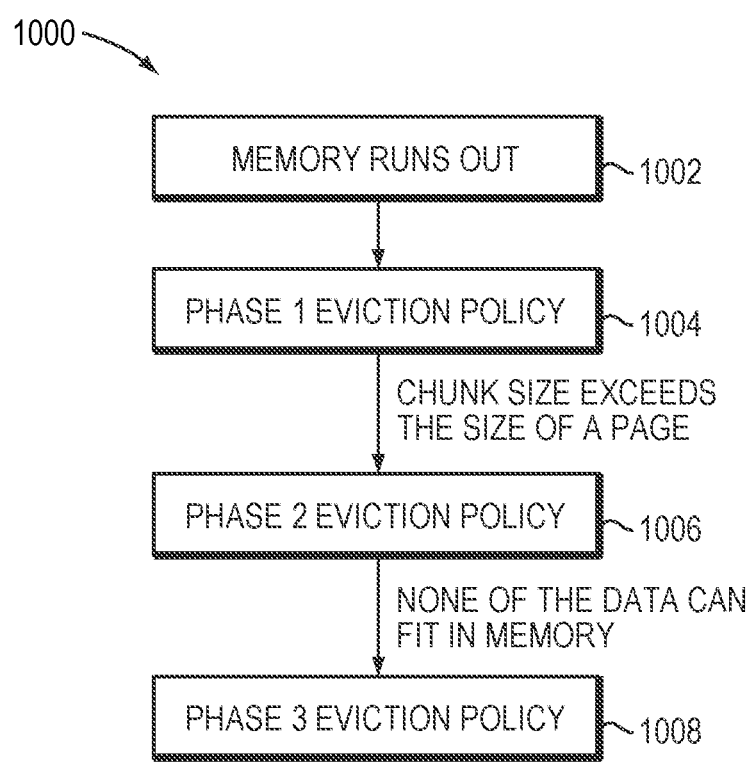
FIG. 10 depicts a three-phase eviction policy implemented in the data canopy in accordance with various embodiments.

Referring to FIG. 10, in various embodiments, the data canopy may implement a three-phase eviction policy 1000 to maintain satisfying performance of the data canopy as the size of the data base and/or the size of the data canopy exceeds main memory capacity. In one embodiment, the data canopy maintains a cache of data pages that are evicted when there is memory pressure and reloaded if needed. Similarly, parts of the data canopy may also be evicted and reloaded if needed. This policy captures the case when the base data (or at least a portion thereof) does not fit in memory and/or the case when the data canopy does not fit in memory.

1) Phase 1 of the Eviction Policy

When main memory first runs out, the data canopy may perform the Phase 1 eviction policy that enables the data canopy to shrink horizontally by removing one layer of leaf nodes from every segment tree in a round-robin fashion (steps 1002, 1004). This approach is equivalent to doubling the chunk size. This way, both the base data and the data canopy may still fit in main memory, and the system may maintain satisfying performance (e.g., query processing may be maintained in the order of hundreds of microseconds). If there is more memory pressure and the chunk size exceeds the size of a page (e.g., 4 KB to 64 KB), the data canopy may stop shrinking and moves on to Phase 2.

2) Phase 2 of the Eviction Policy

During Phase 2, the data canopy may maintain data pages in memory only as a cache of frequently accessed data. In one embodiment, the data canopy evicts data pages from main memory using a least-recently-used (LRU) policy (step 1006). The query cost may remain low in this phase because each query has to touch at most 2k pages to scan the residual range (where k is the number of columns referenced by a query). For example, a correlation query needs to access at most two columns and thus touches at most four pages, which may take approximately 40 milliseconds on modern disks. In addition, for frequently accessed chunks, the cache may prevent the query from going to disk.

3) Phase 3

In some embodiments, none of the data can fit in memory; thus, parts of the data canopy may also need to be evicted. In Phase 3 of the eviction policy, the data canopy may evict whole segment trees using the LRU policy (step 1008). These segment trees may be spilled to disk and reloaded if needed. In one embodiment, to make it easy when reloading the segment trees from disk that refer to potentially dirty chunks (i.e., updated), an in-memory bit vector for each segment tree, which marks dirty chunks (e.g., 1 bit per chunk) may be kept in memory. If, however, memory pressure continues, the bit vectors may also be dropped along with the on-disk segment trees from the memory 4) Offline Mode and Memory Pressure When the data canopy is set to offline mode, a set of data (e.g., row and/or columns) and a set of statistical measures may be provided to the data canopy for precomputation. In some embodiments, the data canopy first computes the overall memory footprint that the resulting structure will have; if the footprint exceeds available memory, the data canopy may operate immediately in Phase 3. Optionally, the data canopy may first give the users a warning and/or an option to reduce the amount of data or statistical measures to be included such that they can fit in the memory budget.

H. Updates

In addition, the data canopy may handle insertions, updates and deletions of the base data as further described below. For example, the data canopy may handle the updates incrementally to avoid overhead during online exploration.

1) Inserting Rows

Figure 11:
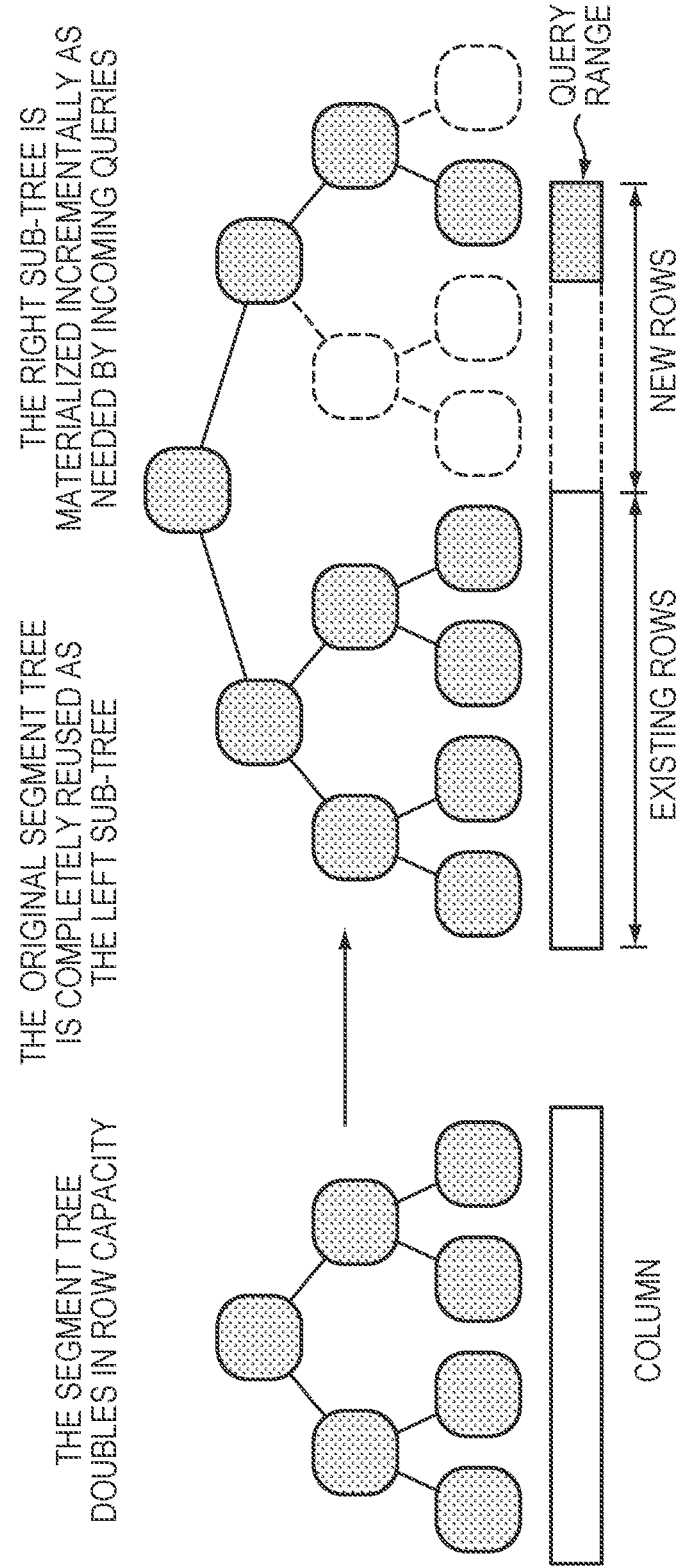
FIG. 11 depicts an approach utilized by the data canopy for handling new data in accordance with various embodiments.

When one or more new rows are inserted and the new total number of rows exceeds the existing capacity of the data canopy, the data canopy may need to expand. In some embodiments, this is achieved by doubling the capacity of the segment trees therein without doubling the size immediately. For example, a root may be added in each segment tree with the previous root as a left child and a new empty right child (and sub-tree). This results in effectively no immediate memory overhead. The data canopy may then populate the new right sub-tree adaptively only when and if the new rows are queried. FIG. 11 schematically depicts this process.

2) Inserting Columns

When one or more new columns are added, the data canopy may simply add the column(s) in its catalog. Given that columns are treated independently, there is no further complexity resulting from the addition of the new column(s). When the data in the new column(s) is queried, the data canopy may allocate segment trees for this column and then populate them incrementally.

3) Updating Rows

When a record x at row r of column c is updated, the data canopy may first retrieve the old value $x_{old}$ of x and use it along with the new value $x_{new}$ of x to update all segment trees that involve column c. For each segment tree, the data canopy may look up the basic aggregate, $y_{old}$, for the chunk where the row r resides, and update it to $y_{new}$:

$$y_{new} = y_{old} - \tau(x_{old}) + \tau(x_{new}) \quad \text{Eq. (15).}$$

Assuming that there are a univariate segment trees on column c, the cost of updating the univariate segment trees is:

$$a \cdot \log_2 \frac{r \cdot v_d}{s}. \quad \text{Eq. (16)}$$

where $\log_2(r \cdot v_d/s)$ represents the depth of the segment trees. Moreover, assuming that there are b bivariate segment trees on column c, the cost of updating the bivariate segment trees is:

$$b \cdot \log_2 \frac{r \cdot v_d}{s} + b. \quad \text{Eq. (17)}$$

The additive b term derives from the fact that one value from another column per segment tree needs to be fetched in order to adjust the sum of products. Thus, the overall update cost $C_{update}$ is computed as:

$$C_{update} = 2 \cdot (a + b) \cdot \log_2 \frac{r \cdot v_d}{s} + b. \quad \text{Eq. (18)}$$

4) Deleting Rows

In various embodiments, the data canopy may delete rows in-place using a standard technique for fixed-size slotted pages, where the granularity of a page is the chunk. Each chunk may have a counter that keeps track of the number of valid rows in the chunk, and the valid rows may be placed first in the chunk. In one implementation, when a row is deleted, each deleted value $x_{old}$ is replaced with the last valid value in the chunk, and the counter is decremented.

In addition, the data canopy may update the segment trees by probing all of them for the basic aggregate for the chunk of the deleted row; the updated basic aggregate satisfies $y_{new} = y_{old} - \tau(x_{old})$. Further, because each chunk is no longer to be assumed full, one invalidity segment tree per table may be maintained to keep track of the number of invalid entries per chunk for subsequent statistical queries. The cost model is the same as for updates having one more additive term of $2 \cdot \log_2(r \cdot v_d/s)$ for updating the invalidity segment tree:

$$C_{delete} = C_{update} + 2 \cdot \log_2 \frac{r \cdot v_d}{s}. \quad \text{Eq. (19)}$$

I. Experimental Analysis

1) Experimental Setup

All experiments described herein are conducted on a server with an Intel Xeon CPU E7-4820 processor, running at 2 GHz with 16 MB L3 cache and 1 TB of main memory. This server machine runs Debian "Jessie" with kernel 3.16.7 and is configured with a hard disk of 300 GB operating at 15 KRPM. The data canopy is implemented from scratch in C++ compiled with gcc version 4.9.2 at optimization level 3. The data canopy may support various univariate statistical measures (e.g., the mean, variance and standard deviation) and bivariate statistical measures (e.g., the correlation and covariance). Performance of the data canopy is compared with widely used statistical packages, NumPy in Python and Modeltools in R as well as MonetDB. In addition, performance of the data canopy is compared against a statistical system "StatSys" that requires full computation to answer the query from scratch each time.

2) Benchmark

In addition, a benchmark is developed to capture a wide range of core scenarios and stress test the data canopy's capability to reuse data access and computation. In some embodiments, exploratory statistical analysis pipelines are generated as sequences of queries; each query requests a computed statistical measure on a range over a data column (or a set of data columns for multivariate statistics). The benchmark includes four distinct workloads generated by varying two parameters: the probability with which queries are distributed over columns and the distribution of query range sizes.

Figures 12A, 12B:
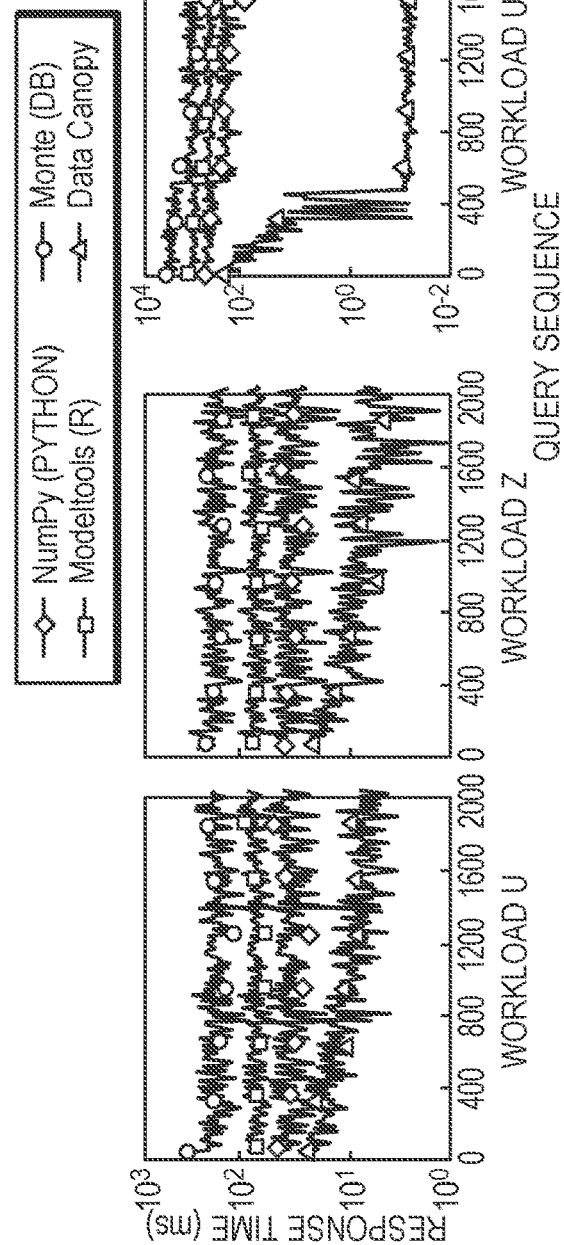
FIG. 12A summarizes various workloads for the data canopy in accordance with various embodiments.
FIGS. 12B(a)-(d) illustrate performance comparison of the data canopy against conventional systems.

FIG. 12A summarizes characteristics of the workloads. Two different distributions of queries over columns, column-uniform (U and $U_+$) and column-zipfian (Z and $Z_+$), may be investigated. In the column-uniform workloads, queries are equally divided between all columns; whereas in the column-zipfian workloads, queries are divided over columns conforming to the zipfian distribution (s=1)—i.e., the column with the highest number of queries has twice as many queries in the workload as compared to the column with the second highest number of queries.

Similarly, two different distributions for the query range sizes are investigated. In the range-uniform workloads (i.e., U, Z), the range sizes are uniformly distributed between 5% and 10% of the total column size. The range-zoom-in workloads (i.e., $U_+$, $Z_+$) emulate a case where the data analysts progressively zoom into the data set to increase the resolution at which the statistical measures are computed. In this case, the range size follows a sequence, where the first query is over an entire range. All subsequent pairs of queries divide the range of previous queries into two equal parts and compute the statistical measures on both parts. One of these parts may then be randomly picked to continue doing the same. For example, zoom-in over a range of size 100 can be the sequence of: {[0;100], [0;50], [50; 100), [50;75), [75;100) . . . }.

These workloads allow us to test the data canopy with different kinds of repetition (similar to those presented in FIG. 1). They map to patterns followed by the data analysts during data exploration. The initial phase of exploratory analysis, often classified as the foraging phase, may exhibit patterns similar to column-uniform workloads. This is when the data analysts compute statistical measures uniformly over multiple columns. Over time, the analysis focuses on a smaller set of columns (e.g., column-zipfian workloads) and requests more detailed information (e.g., range-zoom-in workloads). Additionally, the size of the data sets used here may be derived from real world data sets (e.g., MIMIC data set or data set from General Social Survey (GSS) or Quality of Government (QOG) institute).

3) Reuse in Exploratory Statistical Analysis

When compared against the conventional systems, the data canopy demonstrates its ability to reuse accessed data and computations. The experiment is set up by using a data set containing 40 million rows and 100 columns; each column is populated with double values randomly distributed in $[-10^9, 10^9)$. The total data size is 32 GB. The data canopy is automatically configured with the optimal in-memory chunk size using the approach described above; this results in a chunk size of 256 bytes or 32 data values. The data canopy then operates in the online mode to provide an accurate comparison across all systems as it assumes no preprocessing steps. The results for all four workloads are illustrated in FIG. 12B(a)-(d). Each graph depicts the evolution of the query performance (e.g., the response time on the y-axis) as the query workload evolves (i.e., as more exploratory queries are received on the x-axis). As illustrated, while all conventional systems maintain a relatively constant response time across all workloads, the data canopy improves the response time as it processes more queries. For example, in FIG. 12B(a), after a hundred completely uniform queries, the average response time of the data canopy is 1.9 times lower than NumPy and 11.4 times lower than MonetDB. After 2,000 queries, the performance improvement per query of the data canopy compared to NumPy and MonetDB goes up to 6.7 times and 34.5 times, respectively. Thus, in most cases, the data canopy may significantly reduce the query responding time by multiple orders of magnitude during an exploration path (i.e., over a sequence of queries). The longer the exploration path, the more significant the improvement.

In addition, the data canopy is faster than all other systems when answering even the very first query across all workloads. This is because MonetDB is not tailored for statistics, and contrary to NumPy and R, the data canopy is a tailored C++ implementation for statistics.

In the workloads exhibiting zoom-in patterns (FIG. 12B (c)-(d)), the range size first decreases by half after the first 500 queries and then decreases by another half every 1000 queries. This constant decrease in range sizes is reflected in the response times of all systems. In other words, all systems can improve nearly linearly to the size of the range on which the statistical measures are computed, because fewer data items are required for computations. On the other hand, the data canopy improves drastically by being able to reuse previous data accesses and computations. For all queries after the first 500 queries, the average response time of the data canopy goes down to sub-milliseconds. In addition, even during the first 500 queries, there is a continuous sharp improvement in the data canopy's response time. In both workloads $U_+$ and $Z_+$, the data canopy is completely built at the end of the first 500 queries, and all future queries are directly computed from the basic aggregates within the data canopy. It should be noted that the experimental results described above may undermine the data canopy's performance as all data accessed is "hot" in memory, which is the least favorable scenario for the data canopy that aims for reducing the data access costs.

Figure 13:
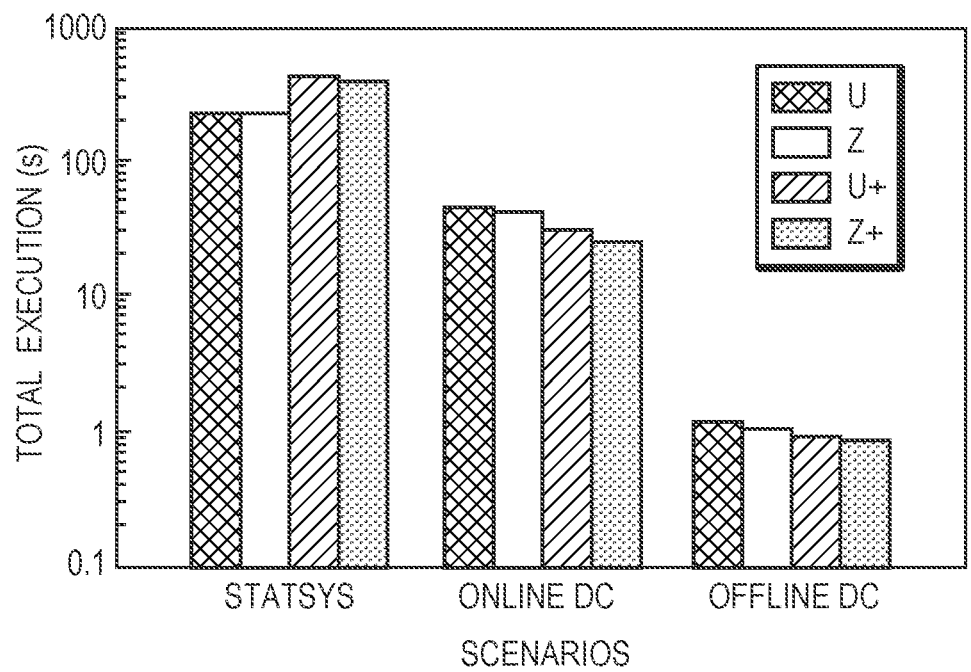
FIG. 13 depicts performance comparison of the offline and online modes of the data canopy as well as StatSys.

FIG. 13 depicts performance comparison of the offline and online modes of the data canopy as well as StatSys (which effectively uses the data canopy code to compute statistical measures but does not cache and reuse the basic aggregates). As shown, the data canopy responds to queries with drastically less cumulative time in all workloads compared to StatSys (e.g., up to one order of magnitude). If the data canopy is allowed to precompute the library of basic aggregates up front (i.e., in the offline mode), this brings yet another improvement of two orders of magnitude (e.g., 194 times to 470.8 times). In this scenario, all queries are directly computed from the data canopy with at most scanning two chunks at the boundaries of its range). Overall, the performance improvement using the data canopy is larger for the range-zoom-in workloads (i.e., $U_+$ and $Z_+$) than the range-uniform workloads (U, Z). This is because the first query on every column in the range-zoom-in workloads results in a complete scan, due to which basic aggregates required for future queries on that column are already computed.

J. Accelerating Machine Learning

Figure 14:
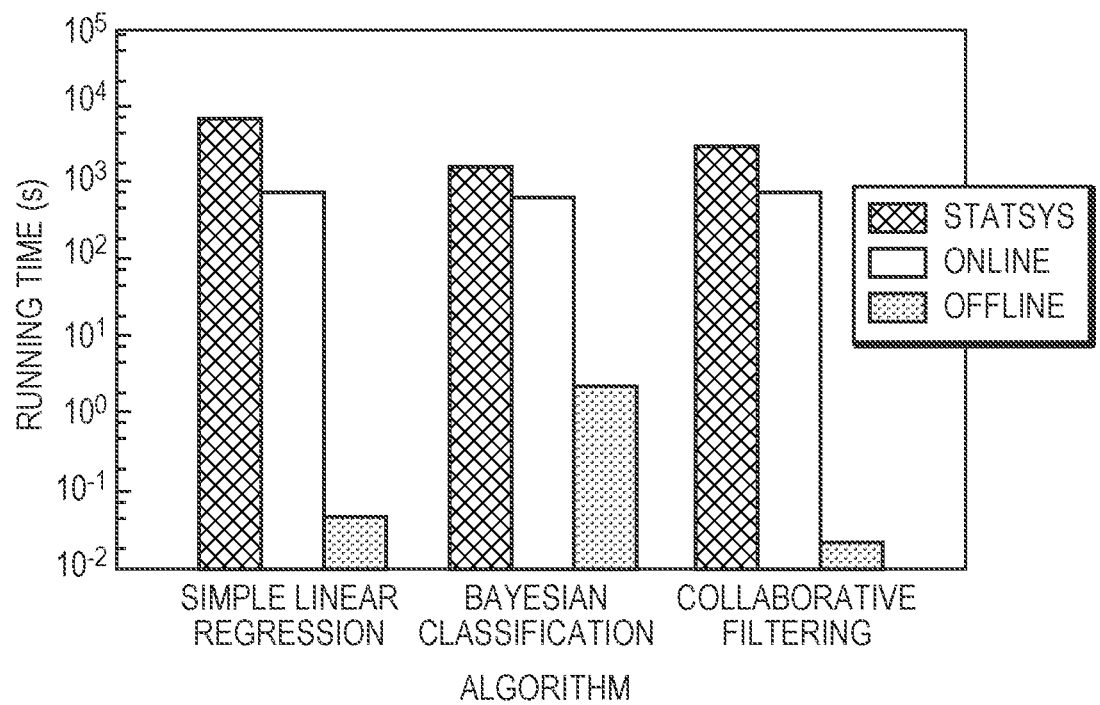
FIG. 14 depicts performance of three machine learning algorithms using Statsys, an online data canopy, and an offline data canopy.

In addition, the data canopy may accelerate core machine learning classification and filtering algorithms. FIG. 14 depicts performance of three machine learning algorithms, including linear regression, Bayesian classification, and collaborative filtering, using Statsys, online data canopy, and offline data canopy. All three machine learning algorithms involve statistical measures (having basic aggregates) cached in the data canopy as primitives. The setup is the same as that in previous experiments (i.e., 40 million rows and 100 columns). Each algorithm is run on the entire data set as follows. First, a simple linear regression is run on all pairs of columns. Second, a Gaussian naive Bayes classifier is trained on the entire data set; the rows in the data set are divided between 40 different classes (one million samples per class). Third, a collaborative filtering (e.g., using correlation as the similarity measure) is run on the entire data set. As shown, the online data canopy (i.e., having no preprocessing steps) results in up to 8 times improvement. This is because running these algorithms results in repetitive calculation of various statistical measures. In addition, when there is enough idle time to build the data canopy offline, up to six orders of magnitude improvement in running time can be acquired for simple linear regression and collaborative filtering, and three orders of magnitude improvement can be obtained for Bayesian classification. The lower improvement for Bayesian classification results from the computation of statistical measures for every class in the data set (i.e., 40 times more queries and each query resulting in scans of up to two chunks per column at the end-points of the query range).

K. Scalability

Figure 15A:
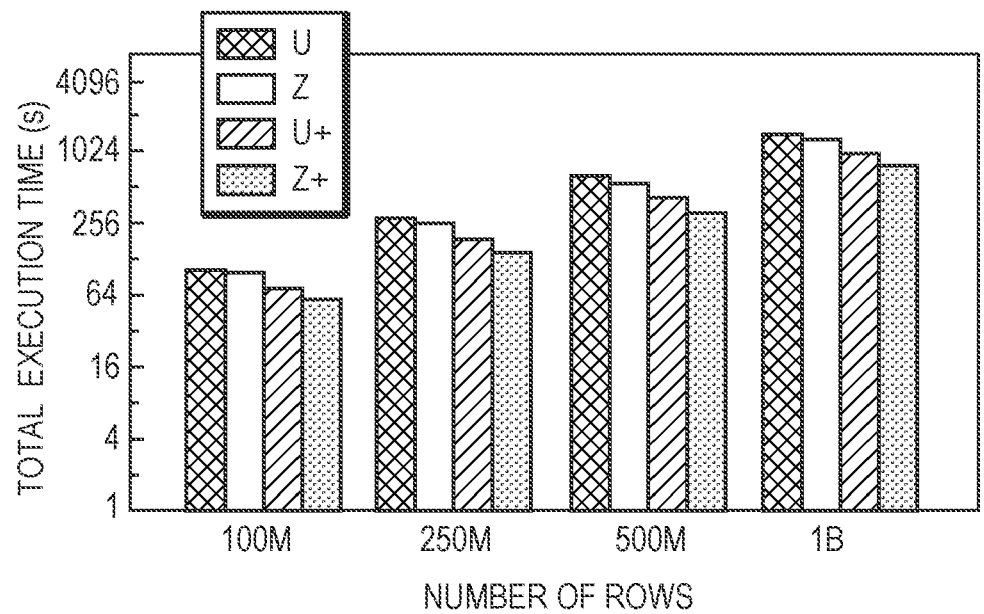
FIG. 15A illustrates a cumulative time of the data canopy in response to an increased number of rows in accordance with various embodiments.

Further, the data canopy may scale with the number of columns and rows in the base data set. FIG. 15A illustrates the cumulative time of the data canopy to run all four workloads when the number of rows is increased from 100 million to one billion. When the number of rows is increased from 100 million to 250 million, the total execution time increases by 2.51 times (average across all workloads); thus the data canopy scales substantially linearly with the number of rows. When the number of rows is increased beyond 250 million, the trend diverges slightly from a linear trend. For example, the increase in cumulative response time as the number of rows is increased from 250 million to 500 million and from 500 million to 1 billion is 2.26 times and 2.3 times, respectively. This super-linear increase in cumulative response time results from an increase of the size of the query range (unif(5,10)% of r), which then causes more chunks to be added to the data canopy data structure for every query that is executed.

Figure 15B:
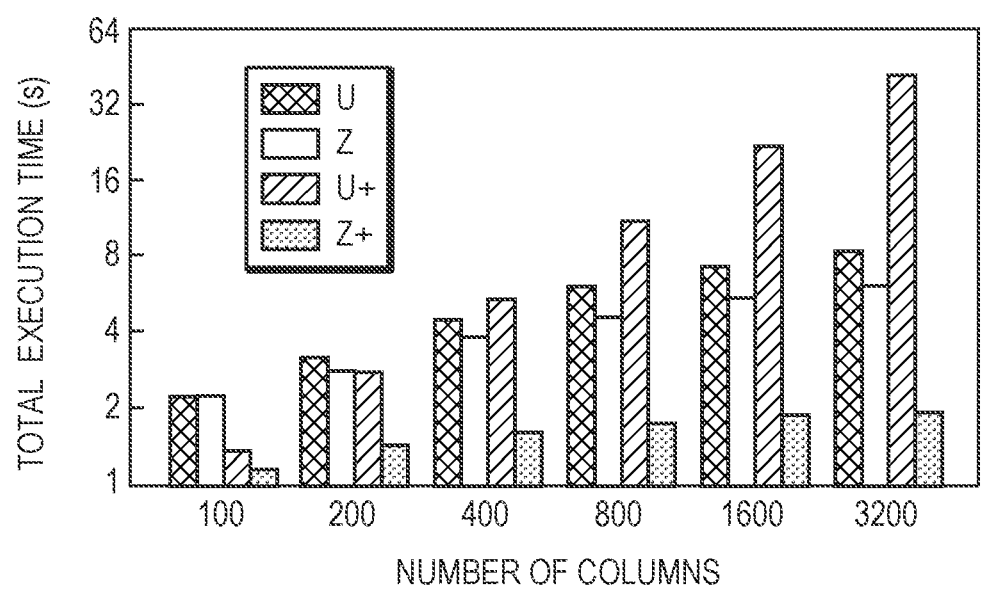
FIG. 15B illustrates a cumulative time of the data canopy in response to an increased number of columns in accordance with various embodiments.

FIG. 15B illustrates the cumulative time of the data canopy to run all four workloads when the number of columns is increased from 100 to 3200 (the number of rows is fixed to one million). When the number of columns is doubled, the execution time increases in a sub-linear fashion—an average increase of 1.68 times and 1.22 times in the total execution time for the uniform (i.e., U and $U_+$) and zipfian (i.e., Z and $Z_+$) workloads, respectively. The higher increase for uniform workloads is due to equal targeting of all columns and the longer time for populating the library of basic aggregates. For the zipfian workloads, since the columns are targeted following a zipfian distribution, increasing the number of columns does not substantially affect the overall execution time—columns that are frequently accessed will have their corresponding library of basic aggregates completely materialized. Accordingly, the data canopy is demonstrated to be capable of scaling with both the numbers of columns and rows in a robust way.

Figure 15C:
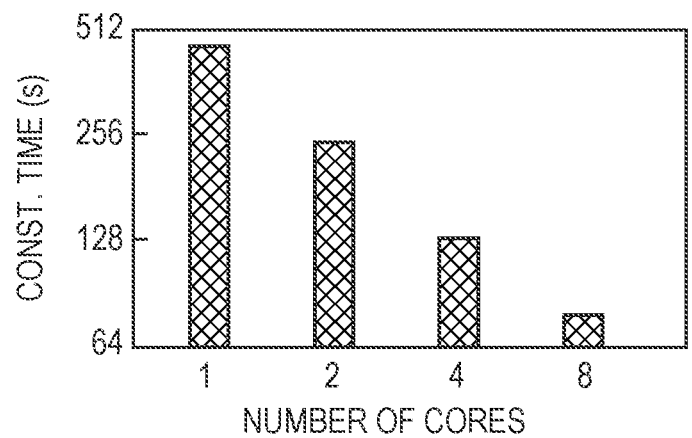
FIG. 15C illustrates a relationship between the construction time of a complete data canopy and the number of processing cores in accordance with various embodiments.
Figure 15D:
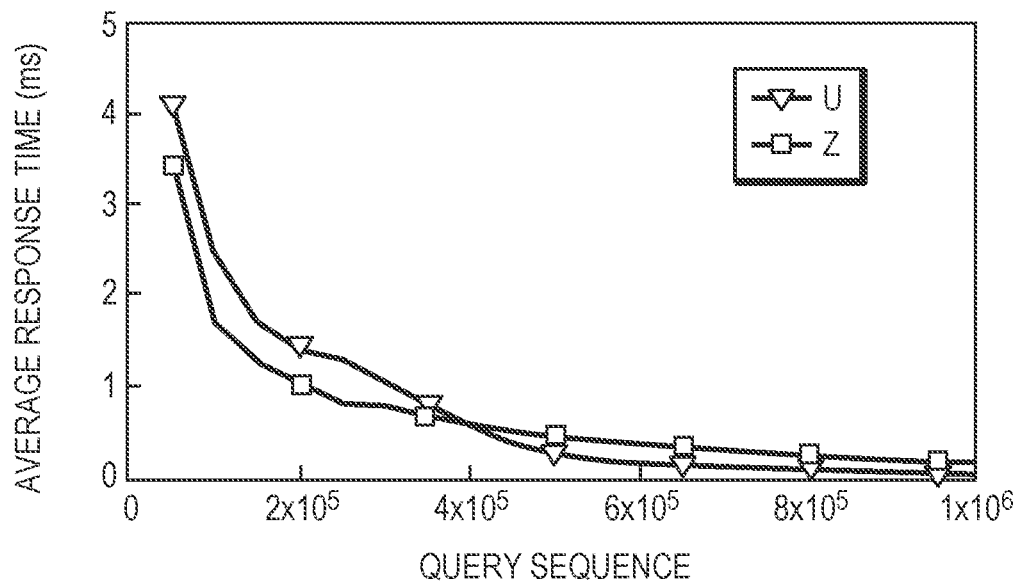
FIG. 15D depicts a relationship between the number of queries and the average response time for every sequence of 50K queries in accordance with various embodiments.

Further, the data canopy may scale with hardware contexts and the number of queries. FIG. 15C illustrates that the construction time of a complete data canopy (on 40 million rows and 100 columns) goes down linearly with the number of cores. This is because the basic aggregates can be computed and cached completely in parallel. FIG. 15D depicts a relationship between the number of queries and the average response time for every sequence of 50K queries. The more queries are processed, the more the data canopy improves. For example, the last query takes up to 190.9 times less time to compute than the first one. Toward the second half of the query sequence, the pace of improvement decreases as more queries can be computed directly from the library of basic aggregates without accessing the base data. The initial improvement in average response time is higher for workload Z as compared to workload U because queries in workload Z exhibit more locality; once the library of basic aggregates are constructed, though, performance is nearly the same for both workloads as all queries are resolved directly from this library with only minor access to the base data (e.g., for residual ranges). For the range-zoom-in workloads ($U_+$ and $Z_+$), because the data canopy is completely built after the first 500 queries, all future queries are computed directly from the data canopy (with minor data accesses to compute residual ranges), and the average response time remains constant thereafter (not shown).

L. Handling Memory Pressure

Figure 16A:
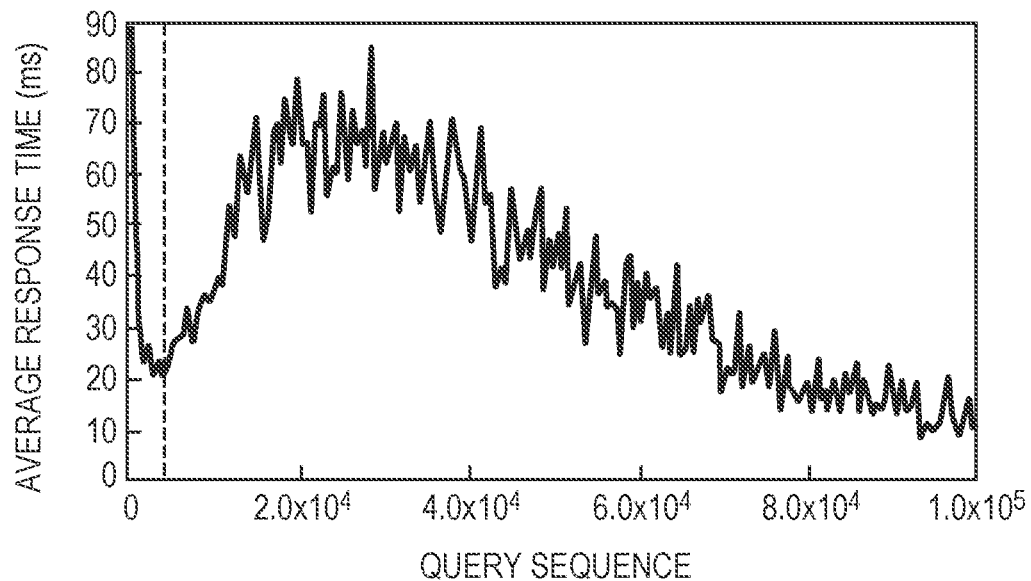
FIG. 16A depicts an average response time of the data canopy in response to an increased memory pressure in accordance with various embodiments.

To investigate how the data canopy handles memory pressure, an experiment having a memory budget of 8 GB and the size of the base data set of 7.2 GB (e.g., having 90 columns, 10 million rows, and 8 bytes of a record size) is performed. This setup indicates that initially the entire data set fits in main memory. In addition, the data canopy operates in online mode—the data canopy has zero memory footprint and grows as more queries arrive. The data canopy then run a sequence of queries from the U workload. This implies that the data canopy incrementally materializes new segment trees, increasing memory pressure. FIG. 16A depicts how the average response time of the data canopy evolves as memory pressure increases. The dotted line depicts the point beyond which the data canopy operates in Phase 2 of the out-of-memory eviction policy as described above (i.e., some data is now accessed from disk). As shown, when the data canopy enters Phase 2, there is an initial increase in query response time. This is because the data canopy is still being built, and every query may result in a scan of data on disk. As the query sequence evolves and the data canopy materializes further, the query response time decreases. Eventually, the data canopy scans at most two chunks per query.

Figure 16B:
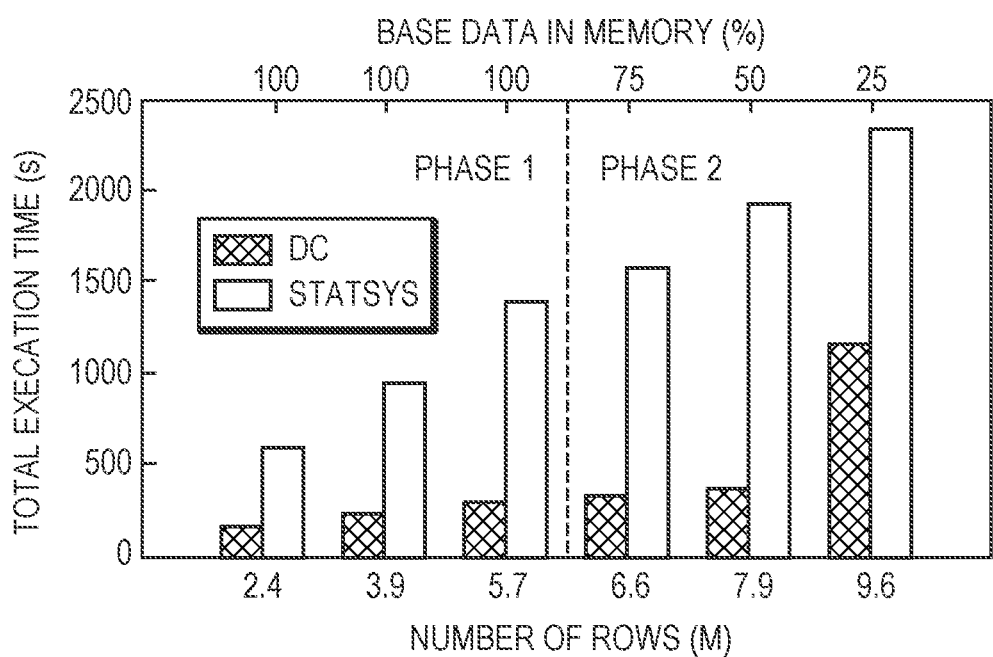
FIG. 16B illustrates a total execution time of a query in response to different memory pressures in accordance with various embodiments.

In another experiment, the number of columns is fixed to 100 and the number of rows is varied to test performance of the data canopy across different stages of Phase 1 and 2 of the out-of-memory policy. FIG. 16B illustrates the total execution times of 10K queries from the U workload under different memory pressures. In Phase 1, the data canopy remains consistently 4 times faster than Statsys. As the memory pressure builds up and the data canopy transitions to Phase 2, the performance of the data canopy continues to perform 4 times better even when only 50% of the data fits in memory. When under extreme memory pressure (e.g., only 25% of the data fits in memory), the data canopy still results in 2 times performance improvement.

M. Memory Footprint, Feasibility and Update

Figure 17A:
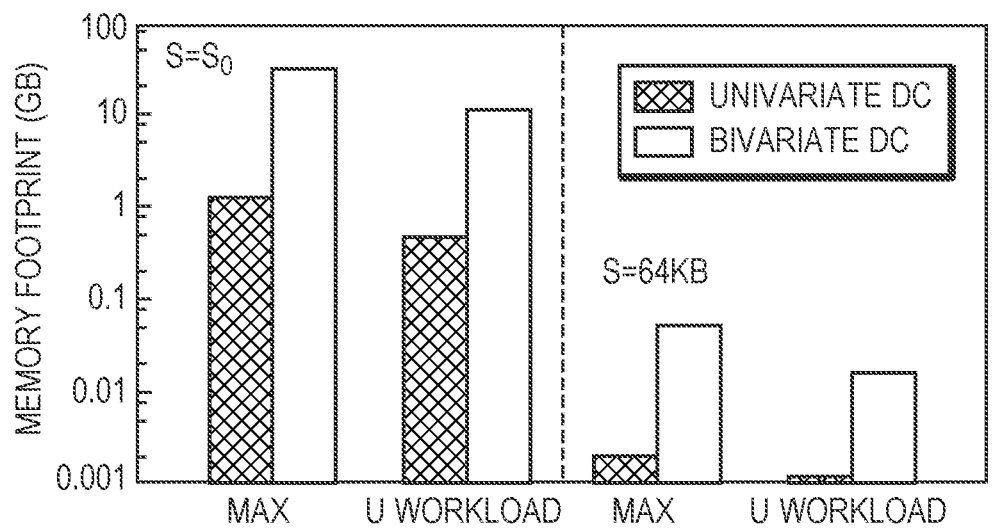
FIG. 17A depicts a chunk size of the data canopy varying between the memory-optimized size and the disk-optimized size under memory pressure in accordance with various embodiments.

The memory footprint of the data canopy may be discussed in two scenarios—when the data canopy is built with the optimal in-memory chunk size (e.g., 256 bytes for the experimentation system as described above) and when, under memory pressure, the data canopy operates in Phase 2 of the out-of-memory policy (e.g., the chunk size grows to 64 KB)—corresponding to the maximum and the minimum memory footprint of the data canopy, respectively. The experiment is on 100 columns and 40 million rows; each node in the data canopy is 8 B; and the analysis is conducted with the U workload when the data canopy operates in online mode. FIG. 17A depicts both the maximum memory footprint of the data canopy in each scenario and the memory footprint after executing 2000 queries. As shown, in the case of univariate statistical measures, the maximum memory footprint is 1 GB and can incrementally shrink down to just 10 MB when under memory pressure. The maximum memory footprint of the bivariate statistical measures is 32 GB and can shrink down to just 490 MB when under memory pressure. More generally, the data canopy can vary its overall size (e.g., by changing its chunk size) to fit within the available main memory. Overall, the usage of the U workload remains less than one-third of the maximum size.

Figure 17B:
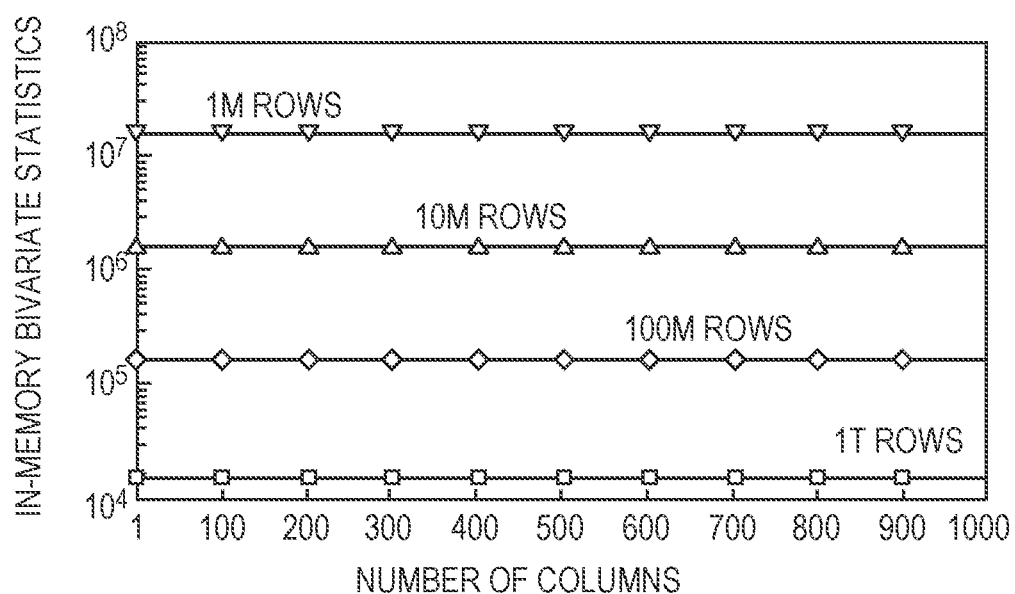
FIG. 17B illustrates the number of bivariate statistical measures supported by the data canopy in accordance with various embodiments.

In addition, the data canopy can efficiently support tens of thousands of bivariate statistical measures over a wide range of data sizes when under memory pressure. In this analysis, the main memory budget is set to 16 GB, the chunk size is equal to a page size (i.e., 64 KB) and the data canopy operates in Phase 2 of the out-of-memory policy. In addition, all univariate segment trees are in memory. FIG. 17B depicts the number of bivariate segment trees that the data canopy supports in the remaining amount of main memory across a wide range of data sizes. Each of the segment trees can be used to answer a bivariate statistical measure over any range of a pair of columns. As shown, even for large data sets (e.g., having 1T rows, 1000 columns and data size to memory ratio of 1:250), the data canopy can still efficiently support up to 10,000 bivariate statistical measures, in addition to all univariate statistical measures.

Figure 17C:
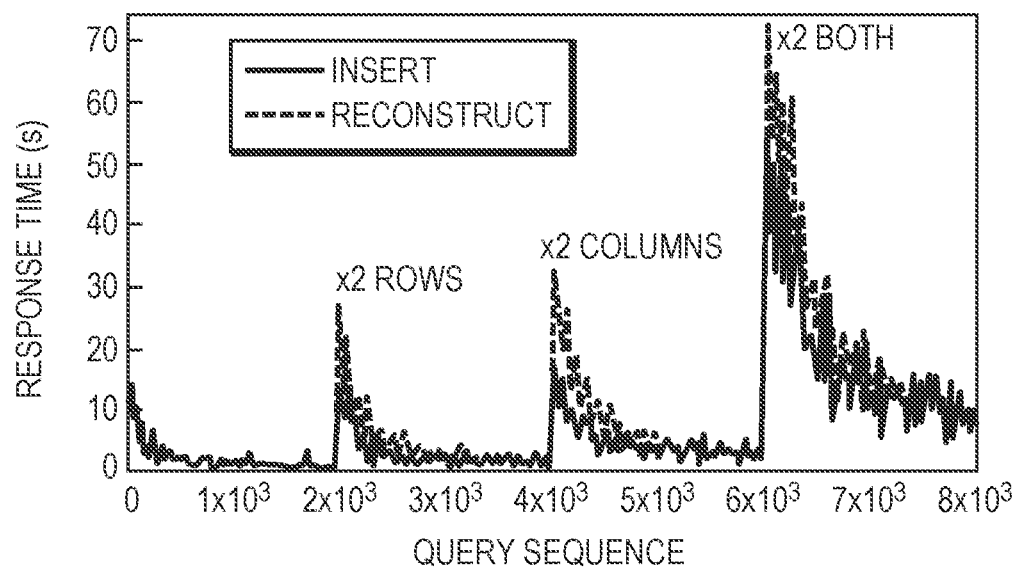
FIG. 17C depicts a response time of the data canopy as a sequence of queries passes through three eviction phases in accordance with various embodiments.

Further, the data canopy can seamlessly handle updates (e.g., insertions of new rows and new columns). This can be illustrated by comparing how the data canopy incrementally handles updates to a reconstruct strategy where the data canopy is built anew every time new data is added. The data canopy starts off with 25 columns and 100 million rows and operates in the online mode. New data is added in three phases, including doubling the number of rows, doubling the number of columns, and doubling both the number of rows and columns, and there is an interval of 2000 queries between each of the phases. At any point in time, the U workload that targets all data that is in the system is run in the analysis. FIG. 17C depicts the response time of the data canopy as the sequence of queries passes through the three phases. As shown, when new data is added, there is an initial increase in response time that converges to the optimal for both strategies. The incremental strategy employed by the data canopy results in lower initial overhead as well as faster convergence to stable performance as compared to the reconstruct strategy. This is because in the incremental strategy, both the insertion of new rows and new columns is handled in a lightweight manner (e.g., merely adding metadata to the catalog) and basic aggregates are materialized only when and if queries target the new data. In addition, the existing library of basic aggregates is completely reused, whereas with the reconstruct strategy, the library is built from scratch after every insertion phase.

Figure 17D:
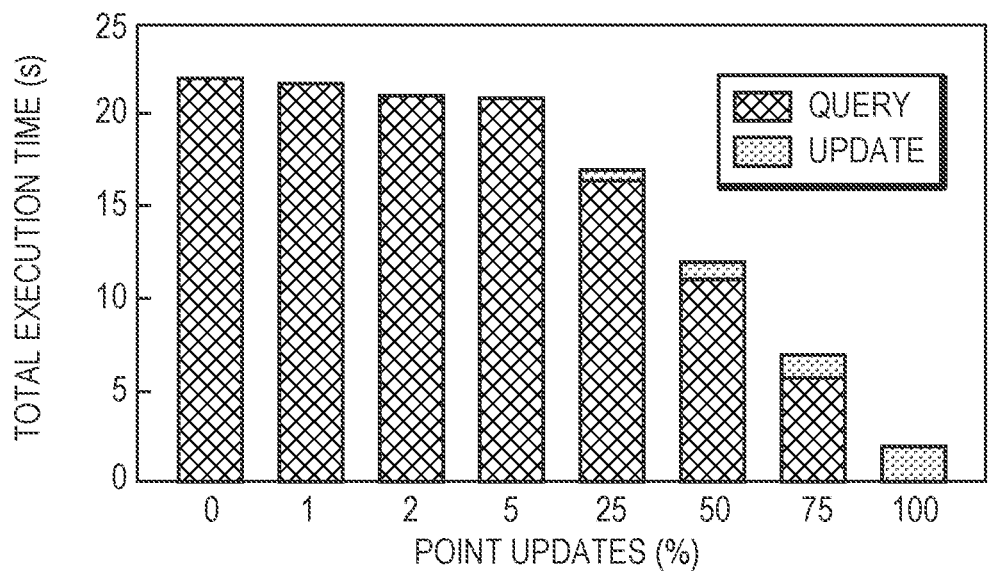
FIG. 17D depicts updates in the data canopy resulting in negligible overhead in accordance with various embodiments.

Additionally, the response time of the data canopy is generally minimally impacted in the presence of updates to existing data. FIG. 17D depicts the results of an experiment having 100 columns, 100 million rows and running 2000 queries from the U workload with a varying percent of point updates in the workload. As shown, the total execution time decreases as the proportion (percentage) of point updates increases in the workload. It should be noted that the overhead introduced by point updates remains low throughout the experiment. For example, in low update scenarios (e.g., 1% to 5% point updates), the overhead is less than 1% percent; and for extremely high update scenarios (e.g., 25% to 75% point updates), the average update overhead is still below 10% of the total execution time.

N. Verifying the Chunk Size Selection

Figure 18:
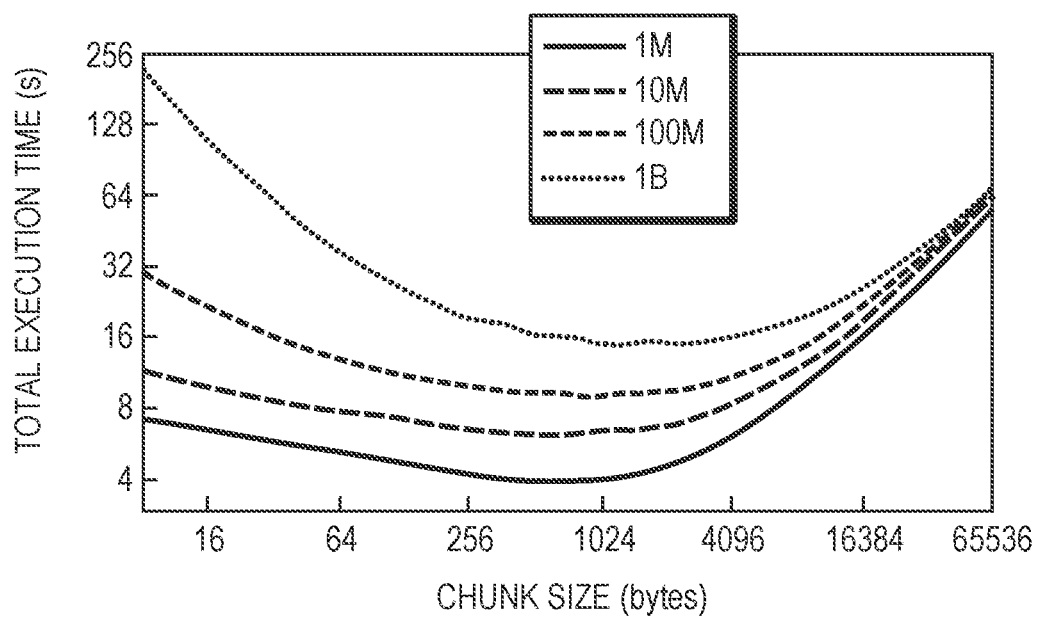
FIG. 18 depicts the query performance of the data canopy as a function of a chunk size in accordance with various embodiments.

To verify the chunk-selection approaches described above, in various embodiments, the chunk size for various number of rows is varied. FIG. 18 depicts various total execution times of 10K queries from the U workload on 100 columns resulting from the chunk-size variations. As shown, there is a convex relationship between the data canopy performance and the chunk size; this verifies the behavior depicted in FIG. 8. In addition, for all data sizes, there is a common chunk size area corresponding to the optimal overall performance. This area is actually quite large (because the x-axis is logarithmic) and so picking any chunk size that is close enough to the center of this area may give optimal behavior. A positive side-effect of this is that there is no need to make the query cost model described above any more complex—e.g., by adding separate weights for when a cache access is a miss or a hit to capture the different latencies (traversing a segment tree may typically cause cache misses while scanning chunks at the endpoints of the query range (residual range) may typically cause a cache miss followed by more than one cache hits). Capturing simply the number of accessed cache lines provides an approach to obtain an estimate close enough in the optimal range —i.e., the analysis shown in FIG. 8 estimates the optimal chunk size to be 220 bytes while FIG. 17 shows that indeed 220 bytes is within the optimal range.

Another advantage of utilizing the cost model described above is to obviate the need for a training process for different machines (e.g., to figure out the cost of different accesses)—all that is required is the cache line size. Thus, to fully optimize performance, the chunk size is selected to be a multiple of the cache line. Here, because the model estimates the optimal chunk size to be 220 bytes, a default chunk size of 256 bytes (i.e., 4 times 64 which is the cache line size) can be selected.

O. Integration of the Data Canopy with Related Work

Modern data systems provide support to compute different statistical measures in the form of aggregate operations, such as AVG, CORR etc. Also, query optimizers estimate query cardinality by using histogram statistics. Recent approaches employ statistics for data integration, time series analysis, and learning. Despite widespread use of statistics in data systems, a framework to compute and reuse various statistical measures during exploratory statistical analysis does not exist. The data canopy described in various embodiments of the present invention introduces such a framework, which replaces ad hoc calculation of statistics and brings opportunities to efficiently compute statistical measures from basic aggregates, compute and cache these basic aggregates ahead of time, and employ the basic aggregates to accelerate exploratory statistical analysis. Statistical measures in the data canopy, primarily computed for exploratory analysis, can also be used within the data system for other tasks, such as query optimization and data integration.

The widespread use of statistics has led to research on calculating fast statistics on large data sets. Some research directions reduce the amount of data touched to compute statistics while providing guarantees on the accuracy; for example, robust sampling techniques are applied to trade accuracy for performance and techniques based on discrete Fourier transforms approximate all-pair correlations for time series. Other research directions present solutions to compute statistics at scale in distributed settings; for example, Cumulon is an end-to-end system, which optimizes the cost of calculating statistics on the cloud. Still other research directions optimize the calculation of various statistical measures by properly partitioning data in distributed settings.

All these approaches innovate on how statistics are computed, and therefore, are all compatible with the data canopy described herein—the data canopy can adopt one or even multiple of these approaches for computing basic aggregates. For example, the data canopy in distributed settings may incorporate aforementioned partitioning techniques to ensure that relevant data is stored at local nodes. The primary advantage that combining the data canopy with these approaches is that the data canopy may compute various statistical measures from the basic aggregates, which can be reused in response to later queried statistical measures. In the presence of workloads exhibiting high locality and repetition, this approach may significantly reduce data movement and memory cost.

For example, the data canopy may be combined with data cubes, which are widely applied in mining data warehouses for storing data aggregated across multiple dimensions. Operators like roll-up, slice, dice, drill-down, and pivot allow data analysts to summarize or further resolve information along any particular dimension in the data cube. Various techniques to improve performance of data cube have been studied. For example, sampling and other approximation techniques are used to reduce both the time required to construct the data cube and answer queries from it. Some approaches only partially materialize data cubes, whereas others present strategies to build them adaptively and in parallel settings. One line of work proposes a simplified and flexible version of the data cube concept in form of small aggregates. Furthermore, recent research designs data cubes for exploratory data analysis; for example, some research directions visualize aggregates stored in data cubes, and others use them for ranking as well as for interactive exploration.

Data cubes, however, do not support a wide range of statistical measures. Specifically, they have no support for multivariate statistics such as correlation, covariance, or linear regression. In addition, data cubes come with a high preprocessing and memory cost that results from calculating and storing aggregates grouped by multiple dimensions. In contrast, the data canopy is both light-weight and is able to reuse and compute an extendible set of statistical measures using a relatively small set of basic aggregates. Further, slices obtained from data cubes in online analytical processing (OLAP) settings can be explored using the data canopy. Once data analysts have developed an understanding of the data set, they may construct more complicated OLAP structures or run more detailed analytics on features and subsets of data that they have identified to be of interest. This approach is more efficient compared to building heavy OLAP structures up front for exploratory statistical analysis.

Additionally, the data canopy may provide a smart cache framework. Query result caching enables database systems to reuse results of past queries to speed up future queries. Most relevant to the data canopy described herein are approaches that enable reuse across different ranges by breaking down queries and caching query results. In addition to decomposing ranges, the data canopy decomposes statistical measures into a library of basic aggregates that can be reused between them. As such, the data canopy can compute descriptive and dependence statistical measures directly from the library of basic aggregates.

More recently, different approaches prefetch both data and query results to accelerate the process of data exploration. Forecache breaks the data down into regions called tiles, and prefetches them based on a data analyst's exploration signature. Similar caching and prefetching strategies have been proposed for the process of data visualization. The data canopy advances this direction of work by providing a smart cache framework that can compute and maintain the library of basic aggregates that can be used as building blocks for a variety of statistical measures and machine learning algorithms.

Further, the data canopy may be applicable in streaming setting. In streaming scenarios, incremental query processing decomposes data streams into smaller chunks and runs queries on these chunks. For example, Window-based approaches partition data and queries such that future windows can make use of past computation. Certain approaches present strategies to incrementally monitor time series data as well as update materialized views. The data canopy in streaming settings may be constructed in a single pass over the data set. When processing huge streams with limited memory, the data canopy may then function as a synopsis for answering a configurable set of statistical queries for exploratory statistical analysis. This synopsis can be constructed and updated incrementally.

In sum, the data canopy described herein may advantageously provide a smart cache framework to accelerate the computation of statistical measures. Specifically, the data canopy breaks the statistical measures down to their basic primitives, caches and maintains the primitives, and uses them to compute future computations of (the same or different) statistical measures on the same or at least partially overlapping data. Contrary to the conventional systems that require scanning the whole data set for computing the statistical measures, the data canopy may interactively compute the statistical measures without repeatedly touching the data; this is particular critical as the data grows. In addition, the data canopy may be computed both offline and online to speed up the response times to queries that at least partially overlap on the base data and/or statistical measures. The data canopy may thus result in a significant speedup of exploratory statistical analysis and machine learning algorithms. This speedup continues to hold as the size of the data and the complexity of the exploration scenario (e.g., the number of repeated queries required to find the desired pattern) increases.

P. Representative Architecture

Figure 19:
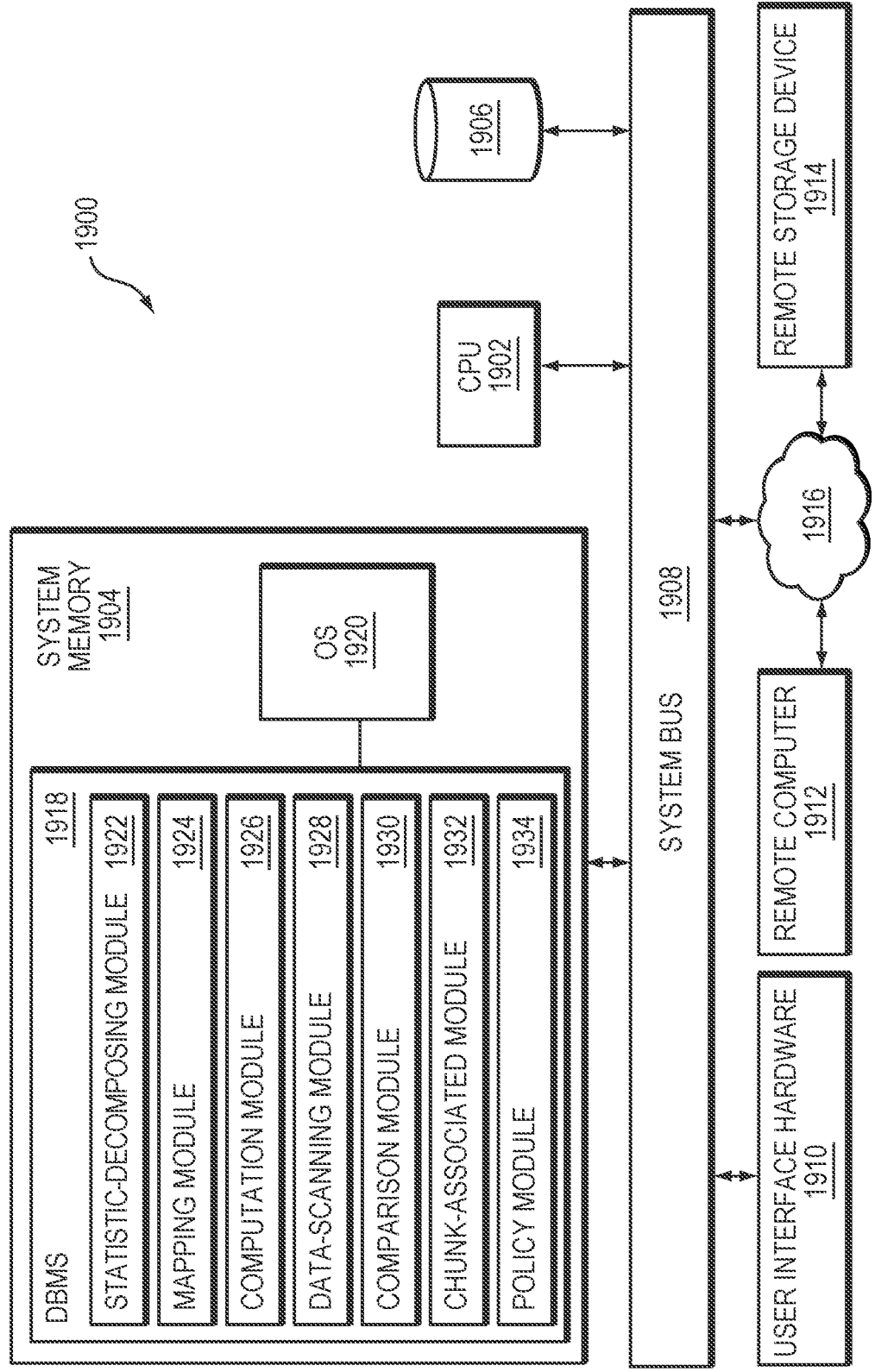
FIG. 19 is a block diagram illustrating a facility for performing the data canopy and computing a result of a queried statistical measure in accordance with various embodiments.

Approaches for utilizing the data canopy to compute a result of a queried statistical measure on a base data in accordance herewith can be implemented in any suitable combination of hardware, software, firmware, or hardwiring. FIG. 19 illustrates an exemplary embodiment utilizing a suitably programmed general-purpose computer 1900. The computer includes a central processing unit (CPU) 1902, at least a main (volatile) memory 1904 having a database, and non-volatile mass storage devices 1906 (such as, e.g., one or more hard disks and/or optical storage units) for storing various types of data. The computer 1900 further includes a bidirectional system bus 1908 over which the CPU 1902, main memory 1904, and storage devices 1906 communicate with each other and with internal or external input/output devices, such as traditional user interface components 1910 (including, e.g., a screen, a keyboard, and a mouse) to allow the user to request a query as well as a remote computer 1912 and/or a remote storage device 1914 via one or more networks 1916. The remote computer 1912 and/or storage device 1914 may transmit any information (e.g., base data, queries, and/or basic aggregates associated with various applications and/or from users) to the computer 1900 using the network 1916.

In some embodiments, the computer 1900 includes a database management system (DBMS) 1918, which itself manages reads and writes to and from various tiers of storage, including the main memory 1904 and secondary storage devices 1906. The DBMS establishes, and can vary, operating parameters including the size of the chunk, the data ranges and statistical computations associated with the basic aggregates, the segment trees storing the basic aggregates, the depth of the segment trees, and the allocation of memory between various segments trees. The DBMS 1918 may be implemented by computer-executable instructions (conceptually illustrated as a group of modules and stored in main memory 1904) that are executed by the computer 1900 so as to control the operation of CPU 1902 and its interaction with the other hardware components.

In addition, an operating system 1920 may direct the execution of low-level, basic system functions such as memory allocation, data management and operation of the main memory 1904 and/or mass storage devices 1906. At a higher level, one or more service applications provide the computational functionality required for implementing the data canopy described herein. In addition, an operating system 1920 may direct the execution of low-level, basic system functions such as memory allocation, data management and operation of the main memory 1904 and/or mass storage devices 1906. At a higher level, one or more service applications provide the computational functionality required for implementing the data canopy described herein. For example, as illustrated, upon receiving a query from a user via the user interface 1910 and/or from an application in the remote computer 1912 and/or the computer 1900, the system 1920 may execute a statistic-decomposing module 1922 stored in the main memory 1904 and/or secondary storage devices 1906 to decompose the received statistical measure to one or more statistical computations and identify the data range(s) corresponding to the statistical computation(s). For example, the statistic-decomposing module 1922 may decompose a variance query to two statistical computations—a summation and a summation of squares as described above. In addition, statistic-decomposing module 1922 may identify, the set of columns targeted by the variance query, the two positions, $R_s$ and $R_e$, in the column set for which the variance query is requested. In some embodiments, the system includes a mapping module 1924 for mapping the statistical computation(s) and/or identified data range(s) to a set of basic statistical aggregates and a set of data chunks, respectively, stored in a library in the memory 1904 and/or secondary storage devices 1906. For example, the mapping module 1924 may map the query range $[R_s, R_e]$ to a set of chunks $[c_s, c_e]$ such that the whole query range is covered by the chunks as described in FIGS. 6A and 6B. In addition, the mapping module 1924 may map the summation and summation of squares associated with the queried variance to the summation and summation of squares stored in the library as described in FIGS. 3A, 6A and 6B. In one embodiment, the system includes a computation module 1926 that computes the resulting value of the queried statistical computation based on the values associated with the mapped basic statistical aggregates and the data chunks stored in the library. In some embodiments, the statistical computations of the received query do not have mapped basic statistical aggregates in the library and/or the boundaries of the identified data range do not align with the boundaries of the data chunks; the system may include a data-scanning module 1928 that directly accesses the base data stored in the main memory 1904 and/or secondary storage devices 1906 for at least partially computing the result of the queried statistical computation. For example, as described above, due to the limited idle time specified by the user, there may be some missing aggregates that are not generated in the offline mode. The data-scanning module 1928 may operate to directly access the base data associated with the missing aggregates and then add them to the library to reduce the number of missing aggregates therein. In addition, when the two end-points of the query range do not align with the existing chunks, the data-scanning module 1928 may scan the base data associated with the two chunks at the end-points of the query range and compute the basic aggregates associated therewith. Further, the computation module 1926 may compute the resulting value of the queried statistical computation based on a combination of the mapped basic statistical aggregates and directly scanning of the base data.

In addition, the computation module 1926 may compute query costs, $C_{scan}$ and $C_{syn}$, described above and determine the boundary query range size $R_b$ based on the query costs. A comparison module 930 implemented in the DBMS may then compare the queried data range with the determined range size $R_b$ and, and based thereon, cause the computation module 1926 to compute the resulting value of the queried statistical computation using the mapped basic statistical aggregates and/or by directly scanning the base data.

In various embodiments, the DBMS further includes a chunk-associated module 1932 for selecting an optimal size of the data chunks based on, for example, properties of the hardware (e.g., cache line size) and/or the type of the queried statistical measure as illustrated in Eq. (10). In particular, because the query cost is a convex function of the chunk size as depicted in FIG. 8, the chunk-associated module 1932 may select the optimal chunk size so as to strike a balance between the number of cache lines accessed when scanning the base data (for the residual range) and when traversing the segment trees. In addition, based at least in part on the selected size of the chunks, the chunk-associated module 1930 may determine an optimal depth of the segment trees that allows the data canopy to access the segment trees within the depth only. Finally, the system may include a policy module 1934 for determining a current eviction policy as described above for evicting a portion of the stored basic statistical aggregates and/or a portion of the base data from the computer memory 1904 based on the eviction policy.

Generally, program modules 1922-1934 include routines, programs, objects, components, data structures, etc. that performs particular tasks or implement particular abstract data types. Those skilled in the art will appreciate that the invention may be practiced with various computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices.

In addition, the CPU 1902 may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform.

The CPU 1902 that executes commands and instructions may be a general-purpose processor, but may utilize any of a wide variety of other technologies including special-purpose hardware, a microcomputer, mini-computer, main-frame computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), smart chip, or any other device or arrangement of devices that is capable of implementing the steps of the processes of the invention.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

More generally, the computer shown in FIG. 19 is representative only and intended to provide one possible topology. It is possible to distribute the functionality illustrated in FIG. 19 among more or fewer computational entities as desired. The network 1916 may include a wired or wireless local-area network (LAN), wide-area network (WAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include the cellular telecommunications infrastructure, WiFi or other 802.11 protocol, Bluetooth, Zigbee, IrDa or other suitable protocol. Furthermore, components of the system may communicate through a combination of wired or wireless paths.

Any suitable programming language may be used to implement without undue experimentation the analytical functions described within. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A system for determining statistical properties of data, the apparatus comprising:
    a computer memory containing (i) a user-supplied statistical query and (ii) a plurality of basic statistical primitives, each basic statistical primitive corresponding to a plurality of data chunks, each of the chunks corresponding to a smallest logical partition of data that includes consecutive values of data from a data structure; and
    a computer processor configured to:
    process the statistical query to identify at least one statistical computation and at least one data range corresponding to the at least one statistical computation;
    map the at least one data range to a subset of the data chunks, wherein the at least one data range comprises a first portion that aligns with boundaries of the subset of the data chunks and a second portion that does not align with boundaries of the subset of the data chunks;
    map the at least one statistical computation to a subset of the basic statistical primitives;
    access data associated with the second portion;
    compute at least one new basic statistical primitive corresponding to the data associated with the second portion;
    perform the statistical computation; and
    respond to the statistical query with the statistical computation, wherein the statistical computation is based at least in part on the subset of data chunks, the subset of basic statistical primitives, and the at least one new basic statistical primitive.

2. The system of claim 1, wherein the plurality of basic statistical primitives is computed prior to processing the received statistic query.

3. The system of claim 1, wherein the plurality of basic statistical primitives is computed during processing of the received statistic query.

4. The system of claim 1, wherein the plurality of basic statistical primitives is stored as a set of segment trees.

5. The system of claim 4, wherein the segment trees comprise binary trees.

6. The system of claim 4, wherein each segment tree is associated with a pointer stored in the computer memory, and the computer processor is further configured to follow the pointers to access the corresponding segment trees for retrieving the basic statistical primitives.

7. The system of claim 4, wherein the computer processor is further configured to:
compute a first query cost associated with (i) accessing the data associated with the second portion of the at least one data range and (ii) accessing the segment trees associated with the subset of the basic statistical primitives;
compute a second query cost associated with accessing data associated with the first and second portions; and
determine a critical range size based at least in part on the first and second query costs.

8. The system of claim 7, wherein the computer processor is further configured to:
compare the at least one data range to the determined critical range size; and
if the at least one data range is smaller than the determined critical range size, access data associated with the at least one data range and, based thereon, perform the statistical computation.

9. The system of claim 4, wherein the computer processor is further configured to determine an optimal size of the chunks based at least in part on a number of segment trees associated with the first portion of the at least one data range.

10. The system of claim 9, wherein the computer processor is further configured to:
determine an optimal depth of the segment trees based at least in part on the optimal size of the chunks; and
perform the statistical computation based at least in part on the basic statistical primitives associated with the segment trees within the determined optimal depth.

11. The system of claim 1, wherein the computer memory further stores an eviction policy and the processor is further configured to evict a portion of the stored basic statistical primitives and/or a portion of the data in the data structure from the computer memory based on the eviction policy.

12. A method of determining statistical properties of data, the method comprising:
storing, in a computer memory, a plurality of basic statistical primitives, each basic statistical primitive corresponding to a plurality of data chunks, each of the chunks corresponding to a smallest logical partition of data that includes consecutive values of data from a data structure;
receiving a statistical query from a user;
processing the received statistical query to thereby identify at least one statistical computation and at least one data range corresponding to the at least one statistical computation;
computationally mapping the at least one data range to a subset of the data chunks, wherein the at least one data range comprises a first portion that aligns with boundaries of the subset of the data chunks and a second portion that does not align with boundaries of the subset of the data chunks;
computationally mapping the at least one statistical computation to a subset of the basic statistical primitives;
accessing data associated with the second portion;
computing at least one new basic statistical primitive corresponding to the data associated with the second portion;
performing the statistical computation; and
responding to the statistical query with the statistical computation, wherein the statistical computation is based at least in part on the subset of data chunks, the subset of basic statistical primitives, and the at least one new basic statistical primitive.

13. The system of claim 1, wherein performing the statistical computation includes reusing values corresponding to the subset of the basic statistical primitives for the subset of data chunks.

14. The method of claim 12, wherein the plurality of basic statistical primitives is computed prior to processing the received statistic query.

15. The method of claim 12, wherein the plurality of basic statistical primitives is computed during processing of the received statistic query.

16. The method of claim 12, wherein the plurality of basic statistical primitives is stored as a set of segment trees.

17. The method of claim 16, wherein the segment trees comprise binary trees.

18. The method of claim 16, wherein each segment tree is associated with a pointer stored in the computer memory, the method further comprising following the pointers to access the corresponding segment trees for retrieving the basic statistical primitives.

19. The method of claim 16, further comprising:
computing a first query cost associated with (i) accessing the data associated with the second portion of the at least one data range and (ii) accessing the segment trees associated with the subset of the basic statistical primitives;
computing a second query cost associated with accessing data associated with the first and second portions; and
determining a critical range size based at least in part on the first and second query costs.

20. The method of claim 19, further comprising:
comparing the at least one data range to the determined critical range size; and
if the at least one data range is smaller than the determined critical range size, accessing data associated with the at least one data range and, based thereon, performing the statistical computation.

21. The method of claim 16, further comprising determining an optimal size of the chunks based at least in part on a number of segment trees associated with the first portion of the at least one data range.

22. The method of claim 21, further comprising:
determining an optimal depth of the segment trees based at least in part on the optimal size of the chunks; and
performing the statistical computation based at least in part on the basic statistical primitives associated with the segment trees within the determined optimal depth.

23. The method of claim 12, further comprising:
further storing an eviction policy in the computer memory; and
evicting a portion of the stored basic statistical primitives and/or a portion of the data in the data structure from the computer memory based on the eviction policy.

* * * * *